United States Patent
Liu et al.

(10) Patent No.: US 12,164,560 B2
(45) Date of Patent: Dec. 10, 2024

(54) USER INTERFACE SYSTEM, ELECTRONIC EQUIPMENT AND INTERACTION METHOD FOR PICTURE RECOGNITION

(71) Applicant: BOE Technology Group Co., Ltd., Beijing (CN)

(72) Inventors: Hanwen Liu, Beijing (CN); Pablo Navarrete Michelini, Beijing (CN); Dan Zhu, Beijing (CN)

(73) Assignee: Beijing BOE Technology Development Co., Ltd., Beijing (CN)

(*) Notice: Subject to any disclaimer, the term of this patent is extended or adjusted under 35 U.S.C. 154(b) by 731 days.

(21) Appl. No.: 17/255,458

(22) PCT Filed: Nov. 28, 2019

(86) PCT No.: PCT/CN2019/121748
§ 371 (c)(1),
(2) Date: Dec. 23, 2020

(87) PCT Pub. No.: WO2021/102850
PCT Pub. Date: Jun. 3, 2021

(65) Prior Publication Data
US 2021/0373752 A1    Dec. 2, 2021

(51) Int. Cl.
*G06F 3/04842* (2022.01)
*G06F 3/04847* (2022.01)
(Continued)

(52) U.S. Cl.
CPC ...... *G06F 16/5866* (2019.01); *G06F 3/04842* (2013.01); *G06F 3/04847* (2013.01); *G06F 16/55* (2019.01); *G06V 10/20* (2022.01)

(58) Field of Classification Search
CPC .. G06F 16/5866; G06F 16/55; G06F 3/04842; G06F 3/04847; G06V 10/20
See application file for complete search history.

(56) References Cited

U.S. PATENT DOCUMENTS 7,062,453 B1 * 6/2006 Clarke ................ G06Q 30/08
705/37
10,474,705 B2 * 11/2019 Epstein ............... G06F 3/04842
(Continued)

FOREIGN PATENT DOCUMENTS

CN    108205406 A    6/2018
CN    108415635 A    8/2018
(Continued)

*Primary Examiner* — Haoshian Shih
(74) *Attorney, Agent, or Firm* — ArentFox Schiff LLP; Michael Fainberg

(57) ABSTRACT

The present disclosure discloses a user interface system, electronic equipment and an interaction method for picture recognition. The electronic equipment includes a display screen, a memory and a processor, a first interface is displayed on the display screen, and the first interface includes at least one primary function classification tag, a plurality of secondary function classification tags and at least one tertiary function classification tag included in each of the secondary function classification tags; and by selecting a tertiary function classification tag, a second interface can be displayed such that a function effect corresponding to the tertiary function classification tag is experienced on the second interface. The electronic equipment can be used such that different tertiary function classification tags can be selected for experience in the first interface, can provide users with practicality, and has certain tool properties.

19 Claims, 24 Drawing Sheets

(51) Int. Cl.
*G06F 16/55* (2019.01)
*G06F 16/58* (2019.01)
*G06V 10/20* (2022.01)

(56) References Cited

U.S. PATENT DOCUMENTS

| | | | |
|---|---|---|---|
| 2007/0150839 A1* | 6/2007 | Danninger | G06F 3/0482 |
| | | | 715/825 |
| 2011/0320984 A1* | 12/2011 | Irani | G06F 3/0482 |
| | | | 715/841 |
| 2015/0154676 A1* | 6/2015 | Matousek | G06F 40/186 |
| | | | 705/26.5 |
| 2018/0176357 A1 | 6/2018 | Kim et al. | |
| 2019/0236351 A1 | 8/2019 | Mizukura | |
| 2019/0243531 A1 | 8/2019 | Chou et al. | |

FOREIGN PATENT DOCUMENTS

| | | |
|---|---|---|
| CN | 110135929 A | 8/2018 |
| CN | 109085982 A | 12/2018 |
| CN | 110097057 A | 8/2019 |

* cited by examiner

Intelligent album management

Obtaining tags of type, theme, and content by recognizing pictures, and classifying the pictures intelligently according to the tags to generate various albums or lists Content recommendation Pushing personalized pictures precisely by using the tags according to user preferences Contact us     Suggestion feedback

Displaying a first interface on a display screen, the first interface includes a first region and a second region, the first region includes at least one primary function classification tag, and the second region includes a plurality of secondary function classification tags and at least one tertiary function classification tag included in each of the secondary function classification tags — S101

In response to a trigger instruction of selecting one of the at least one primary function classification tag, displaying a plurality of secondary function classification tags included in the selected primary function classification tag and at least one tertiary function classification tag included in each of the displayed secondary function classification tags in the second region on the display screen — S102

In response to a trigger instruction of selecting one of the at least one tertiary function classification tag, displaying a second interface on the display screen, content included in the second interface is different from content included in the first interface — S103

FIG. 21

USER INTERFACE SYSTEM, ELECTRONIC EQUIPMENT AND INTERACTION METHOD FOR PICTURE RECOGNITION

CROSS REFERENCE TO RELATED DOCUMENTS

The present application is a national phase entry under 35 U.S.C. § 371 of International Application No. PCT/CN2019/121748, filed on Nov. 28, 2019.

FIELD

The present disclosure relates to the field of terminal technologies, and particularly relates to a user interface system, electronic equipment and an interaction method for picture recognition.

BACKGROUND

With the advancement of terminal technologies, functions of electronic equipment such as mobile phones are becoming more and more abundant. A user needs to install various applications in a mobile phone to meet different experience demands, such as picture beautification, image recognition and face recognition, and respectively opens the corresponding applications when using them. However, when the user has more experience demands, the user needs to download and install more applications.

SUMMARY

Embodiments of the present disclosure provide an interaction method for picture recognition through a user interface, including:

providing a plurality of first function controls, at least one second function control, at least one third function control and a picture display control in the user interface;

presenting, in each of the plurality of first function controls, a first picture corresponding to the each of the plurality of first function controls, wherein presentation states of an object in first pictures in the respective first function controls are different;

in response to a selection instruction for the second function control, receiving a second picture selected and uploaded by a user;

after receiving a selection instruction for one of the plurality of first function controls or receiving an instruction of the user selecting and uploading the second picture, updating a picture in the picture display control to a first picture corresponding to the one of the plurality of first function controls or the second picture, and presenting attribute information of the updated picture on the user interface; and after presenting the attribute information of the updated picture and receiving a selection instruction for the third function control, storing the attribute information of the updated picture into a first data list.

Optionally, in the interaction method provided by embodiments of the present disclosure, the attribute information of the updated picture includes at least one of text information, alphabetic information or digital information.

Optionally, in the interaction method provided by embodiments of the present disclosure, after presenting the attribute information of the updated picture and receiving the selection instruction for the third function control, storing the attribute information of the updated picture into the first data list includes:

when a plurality of pieces of the attribute information are presented, after receiving selected attribute information and receiving the selection instruction for the third function control, storing the selected attribute information into the first data list.

Optionally, in the interaction method provided by embodiments of the present disclosure, the presentation state includes: at least one of an inclined state of the object or a distorted state of the object.

Accordingly, embodiments of the present disclosure further provide a user interface system for picture recognition, including a plurality of first function controls, at least one second function control, at least one third function control and a picture display control displayed in a user interface, each of the plurality of first function controls presents a first picture corresponding to the each of the plurality of first function controls in the user interface, and presentation states of an object in first pictures in the respective first function controls are different;

after the second function control is selected, it is operable to enable a user to select and upload a second picture;

after one of the plurality of first function controls is selected or after an operation of the user selecting and uploading the second picture, the selected first function control is operable to enable a picture in the picture display control to be updated to a first picture corresponding to the one of the plurality of first function controls or the second picture, and enable attribute information of the updated picture to be presented on the user interface; and after presenting the attribute information of the updated picture and selecting the third function control, the third function control is operable to enable the attribute information of the updated picture to be stored into a first data list.

Accordingly, embodiments of the present disclosure further provide electronic equipment, including a display screen, a memory and a processor, the memory is connected to the display screen and the processor and configured to store computer instructions and save data associated with the display screen; and the processor is connected to the display screen and the memory and configured to execute the computer instructions to enable the electronic equipment to:

display a first interface on the display screen, wherein the first interface includes a first region and a second region, the first region includes at least one primary function classification tag, and the second region includes a plurality of secondary function classification tags and at least one tertiary function classification tag included in each of the secondary function classification tags;

in response to a trigger instruction of selecting one of the at least one primary function classification tag, display a plurality of secondary function classification tags included in the selected one of the at least one primary function classification tag and the at least one tertiary function classification tag included in each of the displayed secondary function classification tags in the second region on the display screen; and in response to a trigger instruction of selecting one of the displayed at least one tertiary function classification tag, display a second interface on the display screen, wherein content included in the second interface is different from content included in the first interface.

Optionally, in the electronic equipment provided by embodiments of the present disclosure, the first interface further includes a third region, and the third region, the first region and the second region are sequentially arranged along a top-to-bottom direction of the first interface.

Optionally, in the electronic equipment provided by embodiments of the present disclosure, when the display screen displays the first interface, in response to a trigger instruction of directionally moving along a first direction in the second region, a corresponding primary function classification tag is selected.

Optionally, in the electronic equipment provided by embodiments of the present disclosure, when the display screen displays the first interface, in response to a trigger instruction of directionally moving along a second direction, the entire first interface moves along the second direction relative to the display screen, and when the first region of the first interface moves to a top of the first interface, the first region remains at a fixed position, and the second region moves along the second direction.

Optionally, in the electronic equipment provided by an embodiment of the present disclosure, when the display screen displays the second interface corresponding to the selected tertiary function classification tag, the second interface includes a first display region, a second display region, a third display region and a fourth display region;

the first display region includes a tertiary function experience object picture or a tertiary function experience object effect picture; the second display region includes a plurality of example pictures distributed along a third direction, and a size of each of the plurality of example pictures is less than a size of the picture in the first display region;

in response to a selection instruction for one of the plurality of example pictures, the first display region displays an effect picture and a complete picture corresponding to the selected example picture, wherein the effect picture corresponds to a function corresponding to the selected tertiary function classification tag;

in response to a trigger instruction of directionally moving along the third direction, the plurality of example pictures move along the third direction in the second display region;

the third display region includes a first operation tag for uploading pictures; and the fourth display region includes an application scenario tag associated with the selected tertiary function classification tag.

Optionally, in the electronic equipment provided by embodiments of the present disclosure, the first display region, the second display region, the third display region and the fourth display region are arranged along a fourth direction on the second interface, the third direction being a horizontal direction on the display screen, and the fourth direction being a vertical direction on the display screen.

Optionally, in the electronic equipment provided by embodiments of the present disclosure, when the display screen displays the second interface corresponding to the selected tertiary function classification tag, the second interface further includes a fifth display region; and the fifth display region displays attribute information of the complete picture.

Optionally, in the electronic equipment provided by embodiments of the present disclosure, the third display region further includes a second operation tag; and in response to selection of the second operation tag, the attribute information is saved into an attribute information data list.

Optionally, in the electronic equipment provided by embodiments of the present disclosure, when the display screen displays the second interface corresponding to the selected tertiary function classification tag, the second interface includes a first display region, a second display region and a third display region;

in response to input information in the second display region, the first display region of the second interface of the display screen generates a first converted image corresponding to the input information; and the third display region includes a third operation tag and a fourth operation tag, the third operation tag being configured to convert the first converted image into a second converted image, the fourth operation tag being configured to convert the first converted image into a third converted image, and the second converted image and the third converted image being different.

Accordingly, embodiments of the present disclosure further provide an interaction method for electronic equipment, the electronic equipment includes a display screen, and the method includes:

controlling the display screen to display a first interface, wherein the first interface includes a first region and a second region, the first region includes at least one primary function classification tag, and the second region includes a plurality of secondary function classification tags and at least one tertiary function classification tag included in each of the secondary function classification tags;

in response to a trigger instruction of selecting one of the at least one primary function classification tag, controlling the display screen to display a plurality of secondary function classification tags included in the selected one of the at least one primary function classification tag and at least one tertiary function classification tag included in each of the displayed secondary function classification tags in the second region; and in response to a trigger instruction of selecting one of the at least one tertiary function classification tag, controlling the display screen to display a second interface, wherein content included in the second interface is different from content included in the first interface.

BRIEF DESCRIPTION OF THE DRAWINGS

FIG. 18 is a sixteenth schematic diagram of an interface when the electronic equipment provided by an embodiment of the present disclosure performs display;

FIG. 19 is a seventeenth schematic diagram of an interface when the electronic equipment provided by an embodiment of the present disclosure performs display;

FIG. 21 is a schematic flow diagram of an interface display method provided by an embodiment of the present disclosure;

DETAILED DESCRIPTION OF THE EMBODIMENTS

Figure 1:
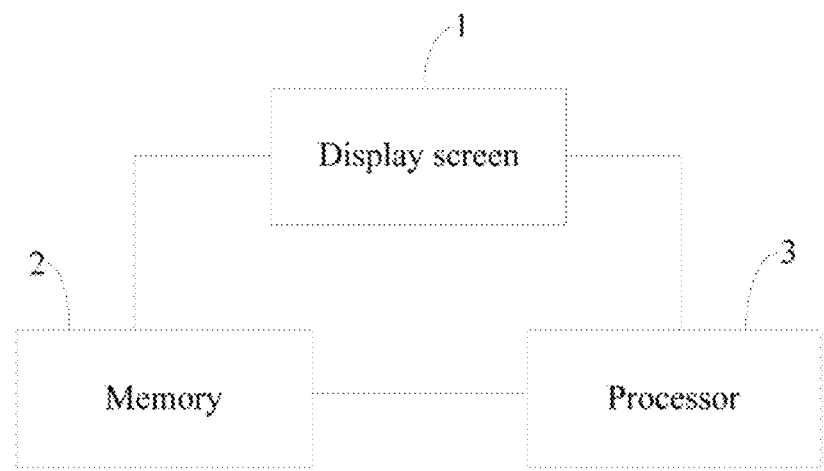
FIG. 1 is a structural schematic diagram of electronic equipment provided by an embodiment of the present disclosure.

In order to make the foregoing objects, characteristics and advantages of the present disclosure more obvious and comprehensible, the present disclosure will be further described below in conjunction with the accompanying drawings and embodiments. However, the exemplary embodiments can be implemented in various forms and should not be construed as being limited to the embodiments set forth herein. In contrast, providing these embodiments makes the present disclosure more comprehensive and complete, and fully conveys the concept of the exemplary embodiments to those skilled in the art. The same reference numerals in the drawings denote the same or similar structures, and thus their repeated description will be omitted. The terms expressing the position and direction described in the present disclosure are illustrated by taking the accompanying drawings as examples, but changes can be made as needed, and the changes are included in the protection scope of the present disclosure. The accompanying drawings of the present disclosure are only intended to illustrate the relative position relationship and do not represent the true scale.

It should be noted that specific details are set forth in the following description in order to fully understand the present disclosure. However, the present disclosure can be implemented in many other manners different from those described herein, and those skilled in the art can make similar promotion without departing from the content of the present disclosure. Therefore, the present disclosure is not limited by the specific embodiments disclosed below. The subsequent description of the specification is preferred embodiments for implementing the present application, but the description is for the purpose of illustrating the general principles of the present application and is not intended to limit the scope of the present application. The protection scope of the present application shall be subject to those defined in the appended claims.

A user interface system, electronic equipment and an interaction method for picture recognition provided by embodiments of the present disclosure will be specifically described below in conjunction with the accompanying drawings.

Electronic equipment provided by some embodiments of the present disclosure, as shown in FIG. 1, includes a display screen 1, a memory 2 and a processor 3.

The memory 2 is connected to the display screen 1 and the processor 3 and configured to store computer instructions and save data associated with the display screen 1.

Figure 2:
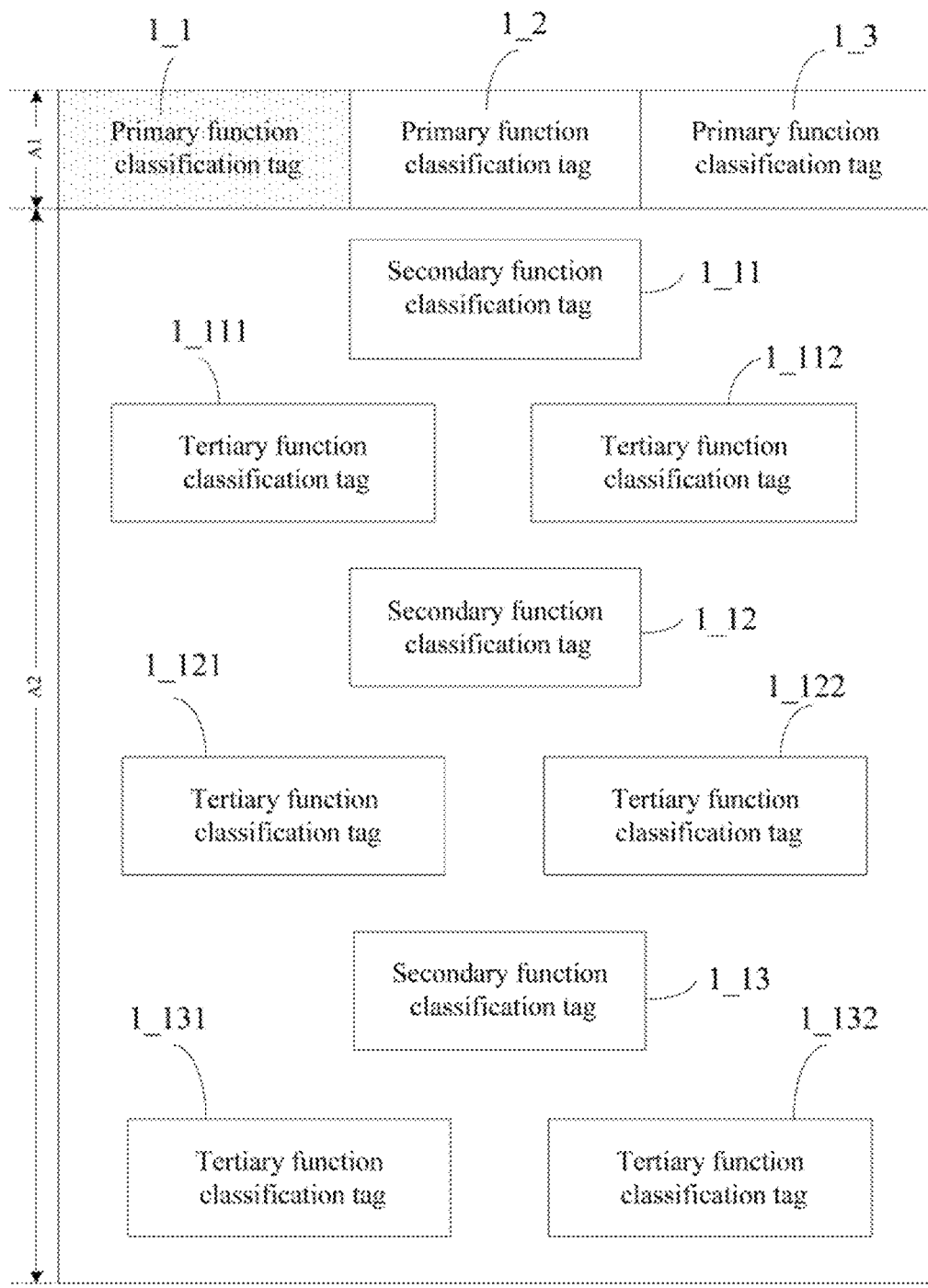
FIG. 2 is a first schematic diagram of an interface when the electronic equipment provided by an embodiment of the present disclosure performs display.
Figure 7:
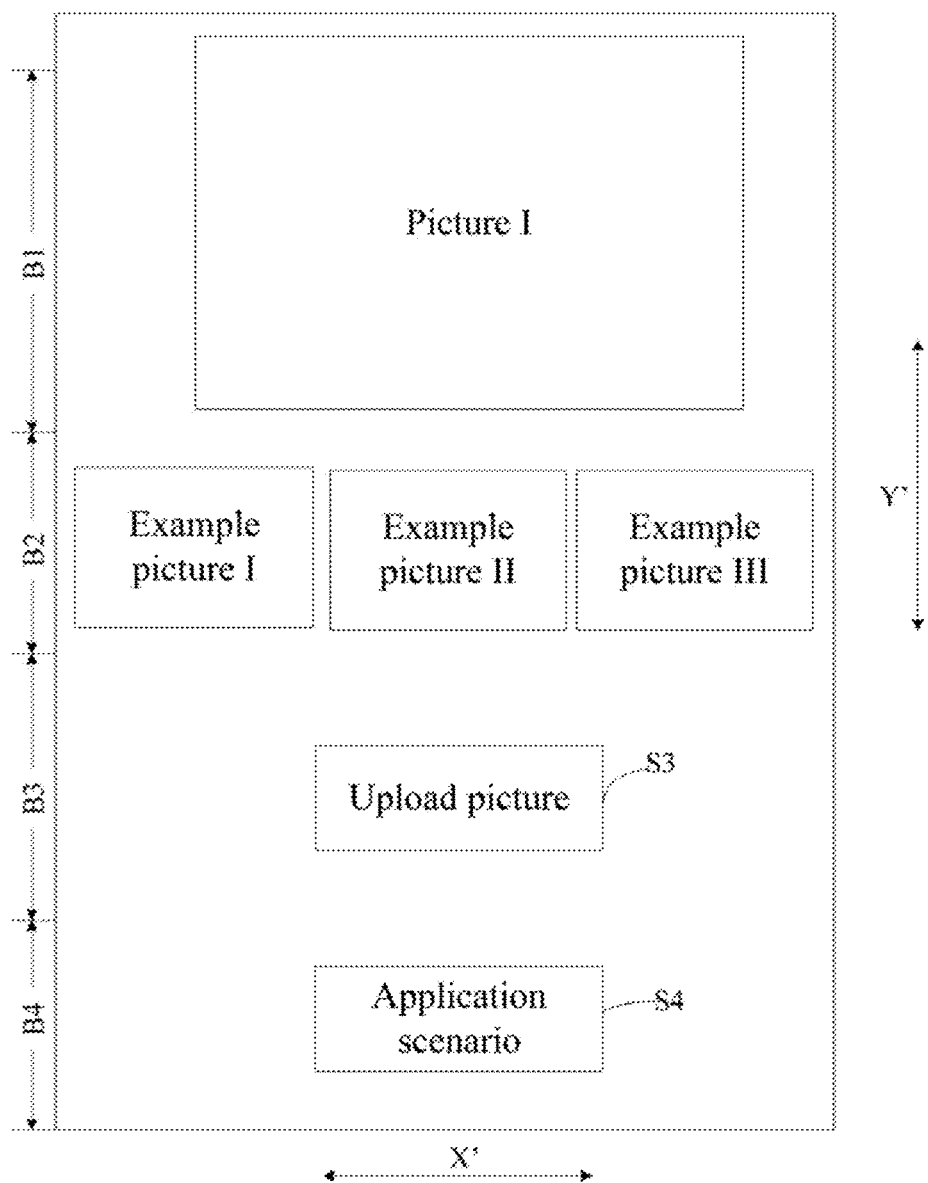
FIG. 7 is a fifth schematic diagram of an interface when the electronic equipment provided by an embodiment of the present disclosure performs display.

The processor 3 is connected to the display screen 1 and the memory 2 and configured to execute the computer instructions to enable the electronic equipment to:

display a first interface 10 on the display screen, as shown in FIG. 2, wherein the first interface 10 includes a first region A1 and a second region A2, the first region A1 includes at least one primary function classification tag 1_n (n is an integer greater than or equal to 1), and the second region A2 includes a plurality of secondary function classification tags 1_nm (m is an integer greater than or equal to 1) and at least one tertiary function classification tag 1_nmk (k is an integer greater than or equal to 1) included in each of the secondary function classification tags 1 nm;

in response to a trigger instruction of selecting one of the at least one primary function classification tag 1_n, display a plurality of secondary function classification tags 1_nm included in the selected primary function classification tag 1_n and the at least one tertiary function classification tag 1_nmk included in each of the secondary function classification tags 1_nm in the second region A2 on the display screen 1 (1_1 in FIG. 2 is the selected primary function classification tag); and in response to a trigger instruction of selecting one of the displayed at least one tertiary function classification tag 1_nmk, display a second interface 20 on the display screen 1, specifically as shown in FIG. 7, wherein content included in the second interface 20 is different from content included in the first interface 10.

Electronic equipment provided by some embodiments of the present disclosure includes a display screen, a memory and a processor. A first interface is displayed on the display screen, and the first interface includes at least one primary function classification tag, a plurality of secondary function classification tags and at least one tertiary function classification tag included in each of the secondary function classification tags. By selecting a tertiary function classification tag, a second interface can be displayed such that a function effect corresponding to the tertiary function classification tag is experienced on the second interface. The electronic equipment can be used such that different tertiary function classification tags can be selected for experience in the first interface, can provide users with practicality, and has certain tool properties.

In specific implementation, in the electronic equipment provided by some embodiments of the present disclosure, the primary function classification tag is a summary of a plurality of secondary function classification tags having the same characteristics, the secondary function classification tag is a summary of a plurality of tertiary function classification tags having the same characteristics, and the tertiary function classification tags respectively correspond to different user experience functions. In specific implementation, the function classification tags at all levels may be named according to experience functions that can be implemented, which is not limited herein. For example, the primary function classification tags are respectively computational vision, image intelligence and human-computer interaction. The secondary function classification tags corresponding to computational vision are respectively picture recognition, optical character recognition (OCR) and face recognition; tertiary function classification tags corresponding to picture recognition may respectively be painting recognition, fruit recognition, food recognition, car recognition, plant recognition, animal recognition and the like; the tertiary function classification tags corresponding to OCR may respectively be business card recognition, bill recognition, barcode recognition and the like; and tertiary function classification tags corresponding to face recognition may respectively be expression recognition, face attribute recognition, similarity recognition and the like. Secondary function classification tags corresponding to image intelligence are respectively image enhancement, new image application, image processing and search by image; tertiary function classification tags corresponding to image enhancement may respectively be high-dynamic range (HDR) processing, image ultrahigh resolution processing and the like; tertiary function classification tags corresponding to new image application may be an artistic two-dimensional code and the like; tertiary function classification tags corresponding to image processing may respectively be image segmentation and transfer, magic dynamic pictures and the like; and tertiary function classification tags corresponding to search by image may respectively be the same image search, similar image search and the like. Secondary function classification tags corresponding to human-computer interaction are respectively natural language processing, gesture interaction, posture interaction and the like; tertiary function classification tags corresponding to natural language processing may respectively be art quiz, knowledge graph and the like; tertiary function classification tags corresponding to gesture interaction may be static gestures, dynamic gestures and the like; and tertiary function classification tags corresponding to posture interaction may be posture estimation and the like.

Figure 3:
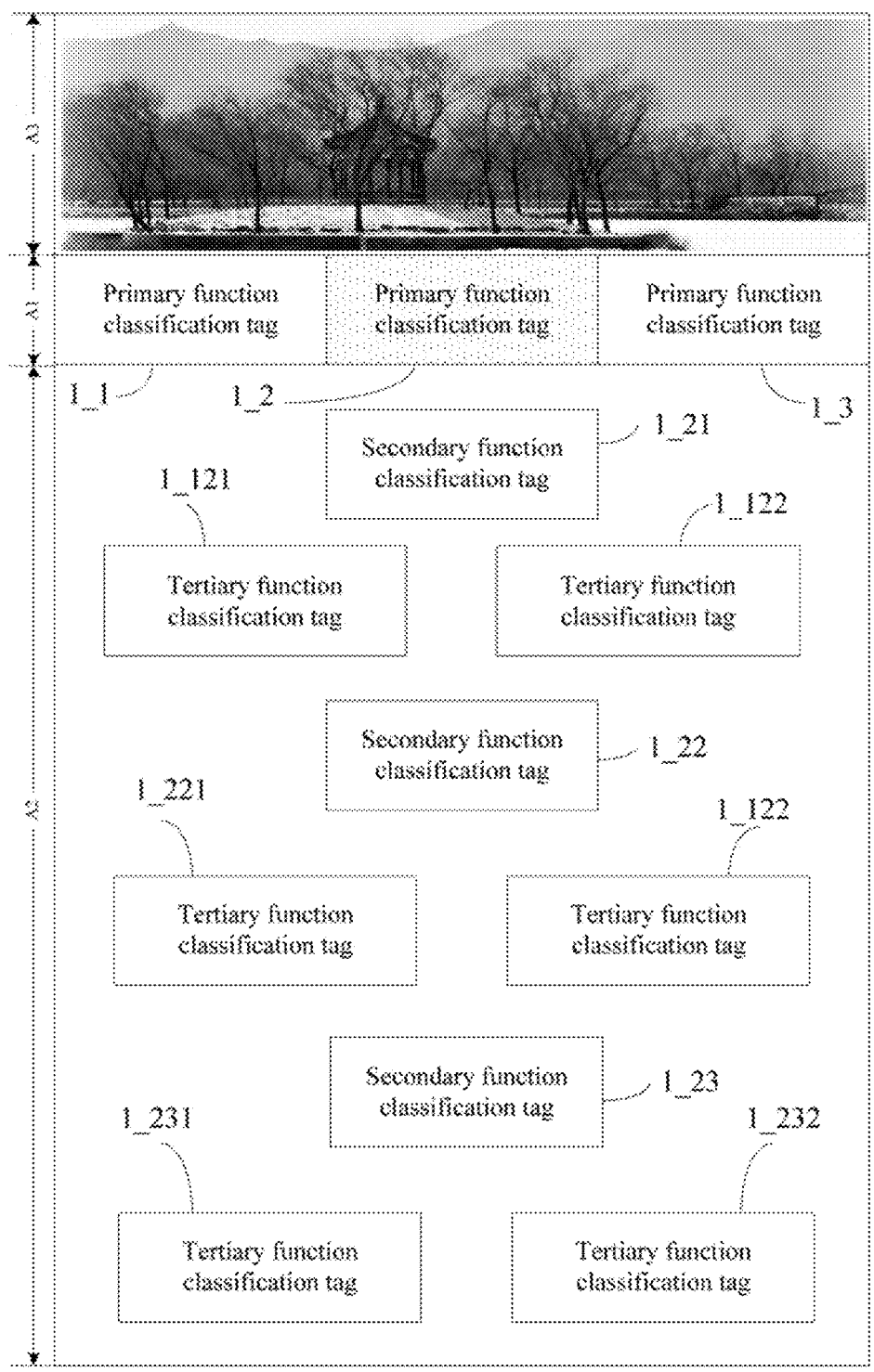
FIG. 3 is a second schematic diagram of an interface when the electronic equipment provided by an embodiment of the present disclosure performs display.

Optionally, in the electronic equipment provided by some embodiments of the present disclosure, as shown in FIG. 3, the first interface 10 further includes a third region A3, and the third region A3, the first region A1 and the second region A2 are sequentially arranged along a top-to-bottom direction of the first interface 10.

In specific implementation, the third region A3 is configured to display static pictures or dynamic pictures.

In specific implementation, content of a picture displayed in the third region is not limited here, and can be set according to needs. For example, the content of the picture is a picture that can display information such as enterprise's advertisements, news and achievements to a user.

Figure 4:
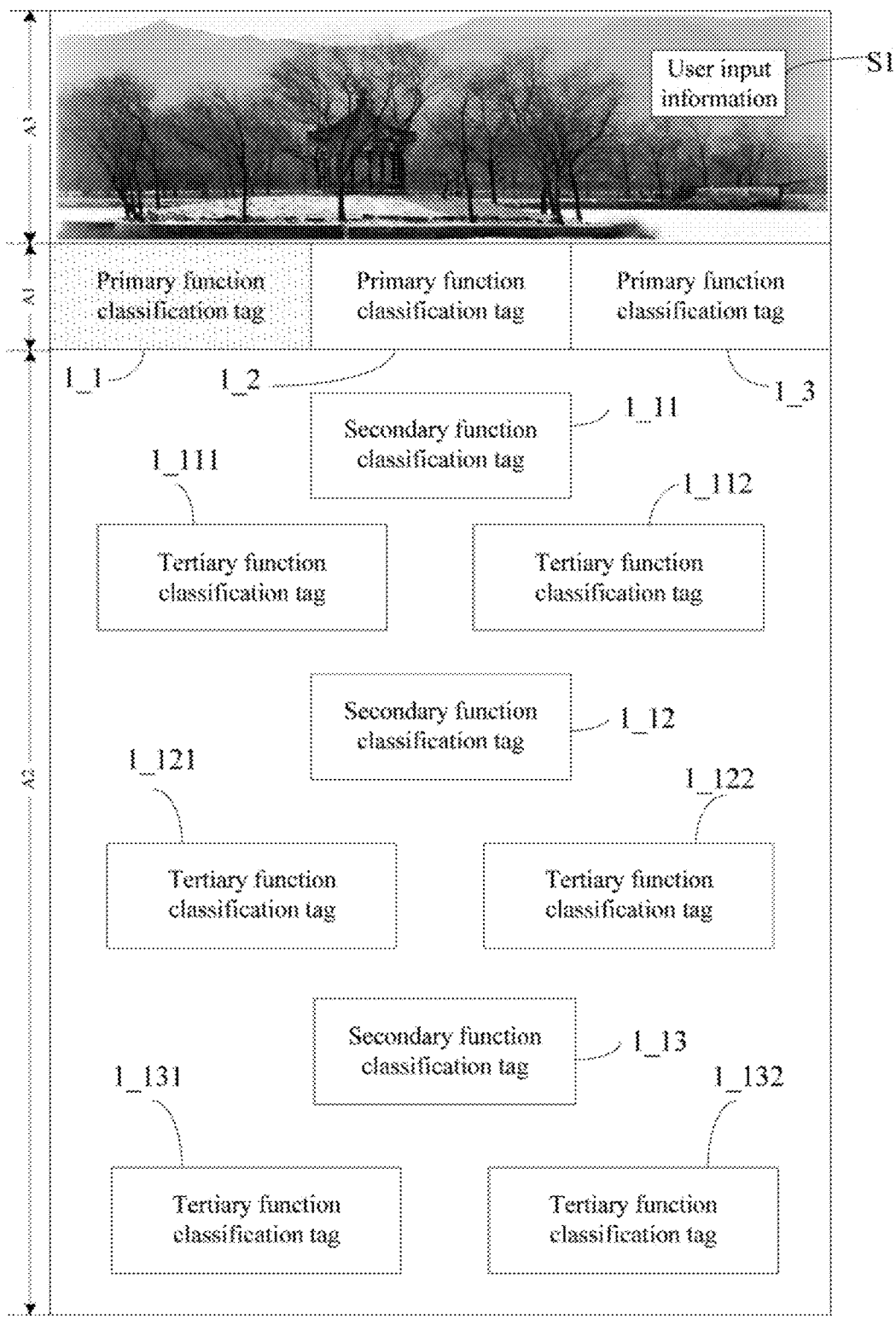
FIG. 4 is a third schematic diagram of an interface when the electronic equipment provided by an embodiment of the present disclosure performs display.

Optionally, in the electronic equipment provided by some embodiments of the present disclosure, as shown in FIG. 4, the third region A3 further includes an operation tag S1 for the user to input information. In specific implementation, the operation tag may be named according to actual needs. For example, a name of the operation tag is cooperation consultation, which is convenient for users interested in seeking cooperation to leave contact information, cooperation information and the like.

Specifically, the operation tag S1 may be located at any position in the third region A3, which is not limited herein.

Further, in specific implementation, the processor is further configured to execute computer instructions to enable the electronic equipment to: in response to a trigger instruction of selecting the operation tag for the user to input information, display an input information box on a new display interface to facilitate the user to input information.

Figure 5:
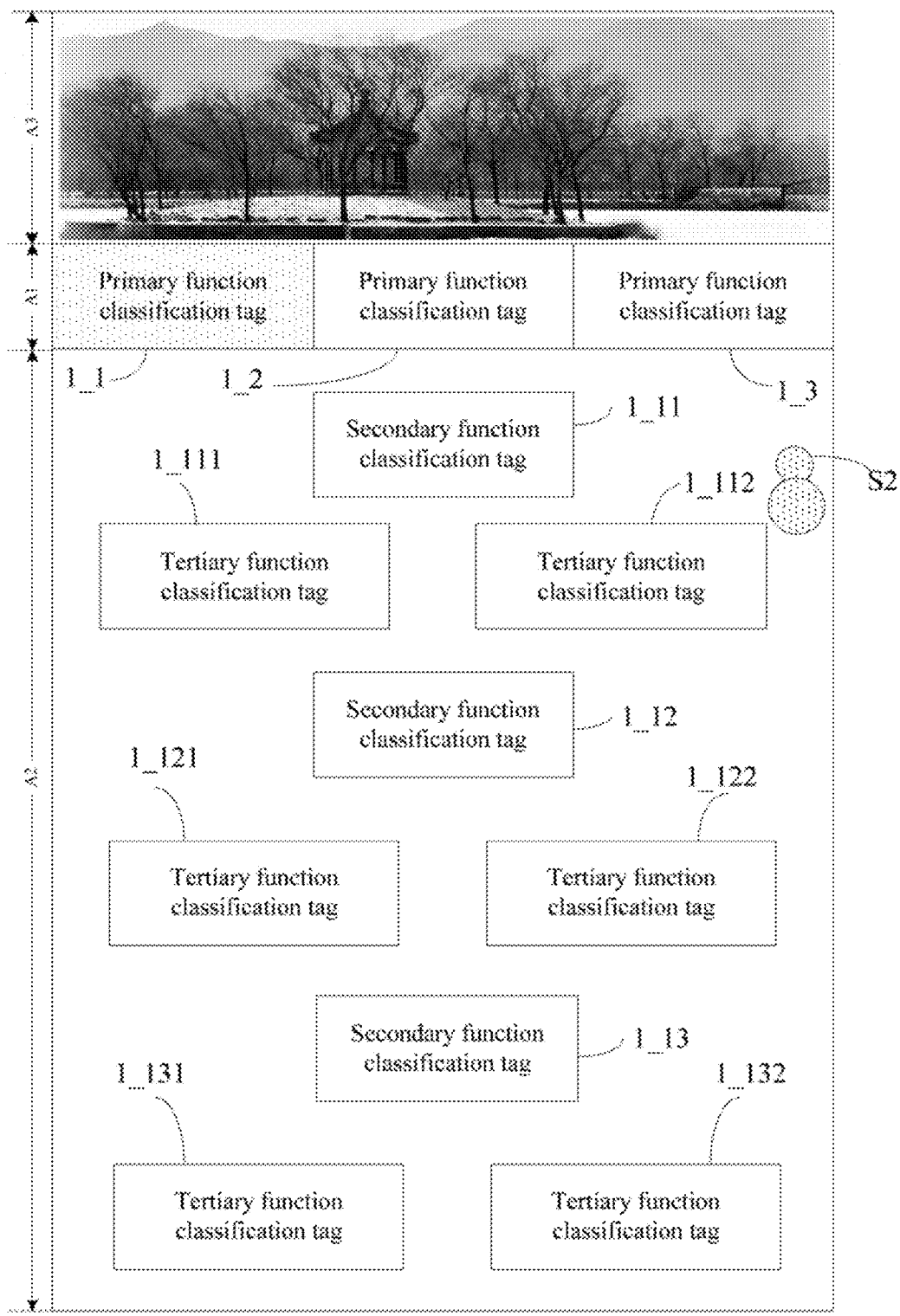
FIG. 5 is a fourth schematic diagram of an interface when the electronic equipment provided by an embodiment of the present disclosure performs display.

Alternatively, optionally, in the electronic equipment provided by some embodiments of the present disclosure, as shown in FIG. 5, the first interface 10 further includes an operation icon S2 for the user to input information, and the operation icon S2 is located at a fixed position on the display screen. When the display screen displays the first interface, the position of the operation icon S2 relative to the display screen is fixed. In specific implementation, the operation icon may be designed as various icons, for example, symbolic icons representing enterprises, which are not limited herein.

Further, in specific implementation, the processor is further configured to execute computer instructions to enable the electronic equipment to: in response to a trigger instruction of selecting the operation tag for the user to input information, display an input information box on a new display interface to facilitate the user to input information.

Optionally, in the electronic equipment provided by some embodiments of the present disclosure, when the display screen displays the first interface, in response to a trigger instruction of directionally moving along a first direction in the second region, a corresponding primary function classification tag is selected.

In specific implementation, the first direction may be a horizontal direction of the display screen, that is, when the display screen displays the first interface, during a directional slide along the first direction X in the second area, the primary function classification tag may be switched. For example, as shown in FIG. 3, under the condition that the primary function classification tag 1_1 is selected in an initial state, when the user slides from left to right along the first direction X in the second region A2, as shown in FIG. 3, the selected classification tag is changed from 1_1 to a primary function classification tag 1_2, and the second region A2 displays a plurality of secondary function classification tags 1_21, 1_22 and 1_23 included in the selected primary function classification tag 1_2 and at least one tertiary function classification tag 1_2mk included in each of the secondary function classification tags 1_2m. Specifically, 1_21 includes 1_121 and 1_122; 1_122 includes 1_221 and 1_222; and 1_23 includes 1_231 and 1_232.

Optionally, in the electronic equipment provided by some embodiments of the present disclosure, when the display screen displays the first interface, in response to a trigger instruction of directionally moving along a second direction, the entire first interface moves along the second direction relative to the display screen, and when the first region of the first interface moves to a top of the first interface, the first region remains at a fixed position, and the second region moves along the second direction.

Figure 6A:
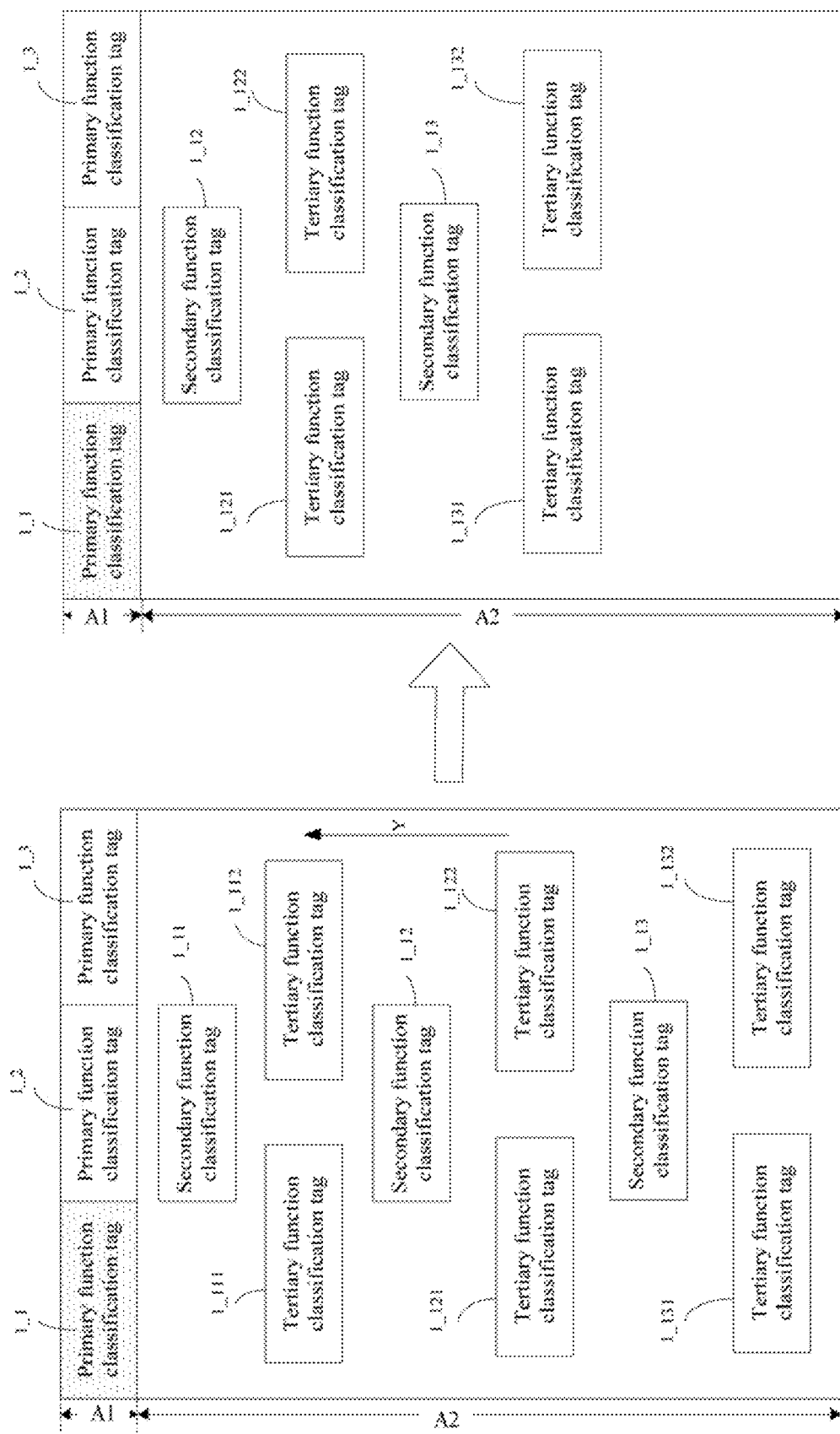
FIG. 6A is a first schematic diagram of an interface change when the electronic equipment provided by an embodiment of the present disclosure performs display.

In specific implementation, the second direction may be a vertical direction of the display screen. When the first interface includes the first region and the second region, as shown in FIG. 6A, during a directional slide along the second direction Y, the first region A1 and the second region A2 move along the second direction Y relative to the display screen, and when the first region A1 moves to the top of the first interface, the first region A1 remains at the fixed position, and the second region A2 moves along the second direction. This is convenient for the user to determine a primary function classification tag to which the content of the currently displayed second region belongs. Alternatively, during the directional slide along the second direction Y, the first region A1 and the second region A2 move along the second direction Y relative to the display screen, which is not limited herein.

Figure 6B:
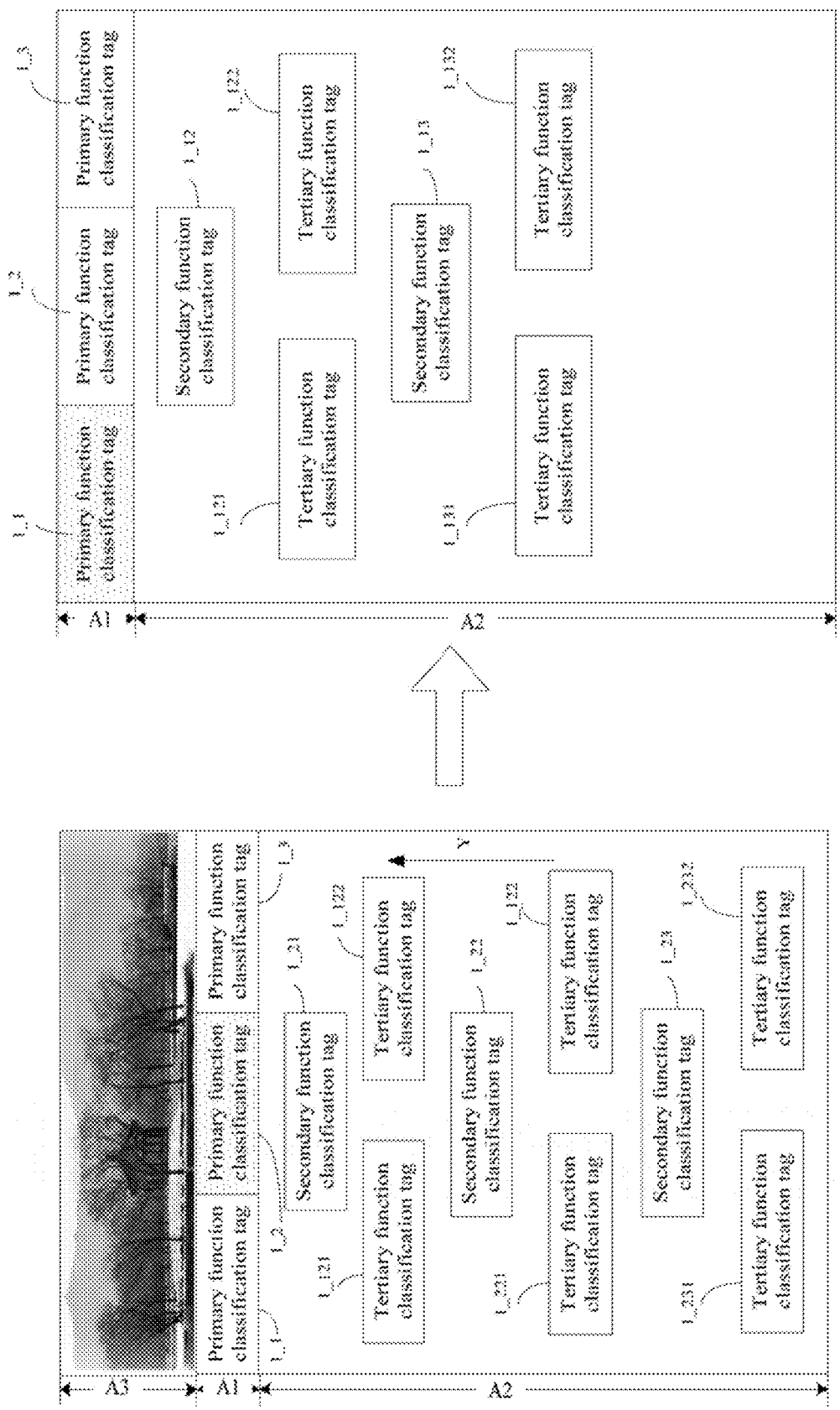
FIG. 6B is a second schematic diagram of an interface change when the electronic equipment provided by an embodiment of the present disclosure performs display.

When the first interface includes the first region, the second region and the third region, as shown in FIG. 6B, during a directional slide along the second direction Y, the first region A1, the second region A2 and the third region A3 move along the second direction Y relative to the display screen, and when the first region A1 moves to the top of the first interface, the first region A1 remains at the fixed position, and the second region A2 moves along the second direction. This is convenient for the user to determine a primary function classification tag to which the content of the currently displayed second region belongs. Alternatively, during the directional slide along the second direction Y, the first region A1, the second region A2 and the third region A3 move along the second direction Y relative to the display screen, which is not limited herein.

Optionally, in the electronic equipment provided by some embodiments of the present disclosure, when the display screen displays the second interface corresponding to the selected tertiary function classification tag, as shown in FIG. 7, the second interface 20 includes a first display region B1, a second display region B2, a third display region B3 and a fourth display region B4.

The first display region B1 includes a tertiary function experience object picture or a tertiary function experience object effect picture, for example, Picture I in FIG. 7; the second display region B2 includes a plurality of example pictures distributed along a third direction X', for example, Example Picture I, Example Picture II and Example Picture III in FIG. 7, and a size of each of the plurality of example pictures is less than a size of the picture in the first display region.

In response to a selection instruction for one of the plurality of example pictures, the first display region B1 displays an effect picture and a complete picture corresponding to the selected example picture. The effect picture corresponds to a function corresponding to the selected tertiary function classification tag.

In response to a trigger instruction of directionally moving along the third direction X', the plurality of example pictures move along the third direction X' in the second display region B2.

The third display region B3 includes a first operation tag S3 for uploading pictures.

The fourth display region B4 includes an application scenario tag S4 associated with the selected tertiary function classification tag.

Specifically, in the electronic equipment provided by some embodiments of the present disclosure, the example pictures may be configured by a background server, which is convenient for the user to directly experience an algorithm effect without uploading pictures.

In specific implementation, the operation tag S3 for uploading pictures in the third display region B3 is convenient for the user to select a local picture or take a picture and upload it.

Optionally, in the electronic equipment provided by some embodiments of the present disclosure, as shown in FIG. 7, the first display region B1, the second display region B2, the third display region B3 and the fourth display region B4 are arranged along a fourth direction Y' on the second interface 20.

Optionally, in the electronic equipment provided by some embodiments of the present disclosure, the third direction is a horizontal direction of the display screen, and the fourth direction is a vertical direction of the display screen.

Further, in a specific embodiment, naming of each tag is not specifically limited, and in actual applications, the naming can be based on a function that each tag needs to achieve.

Figure 8:
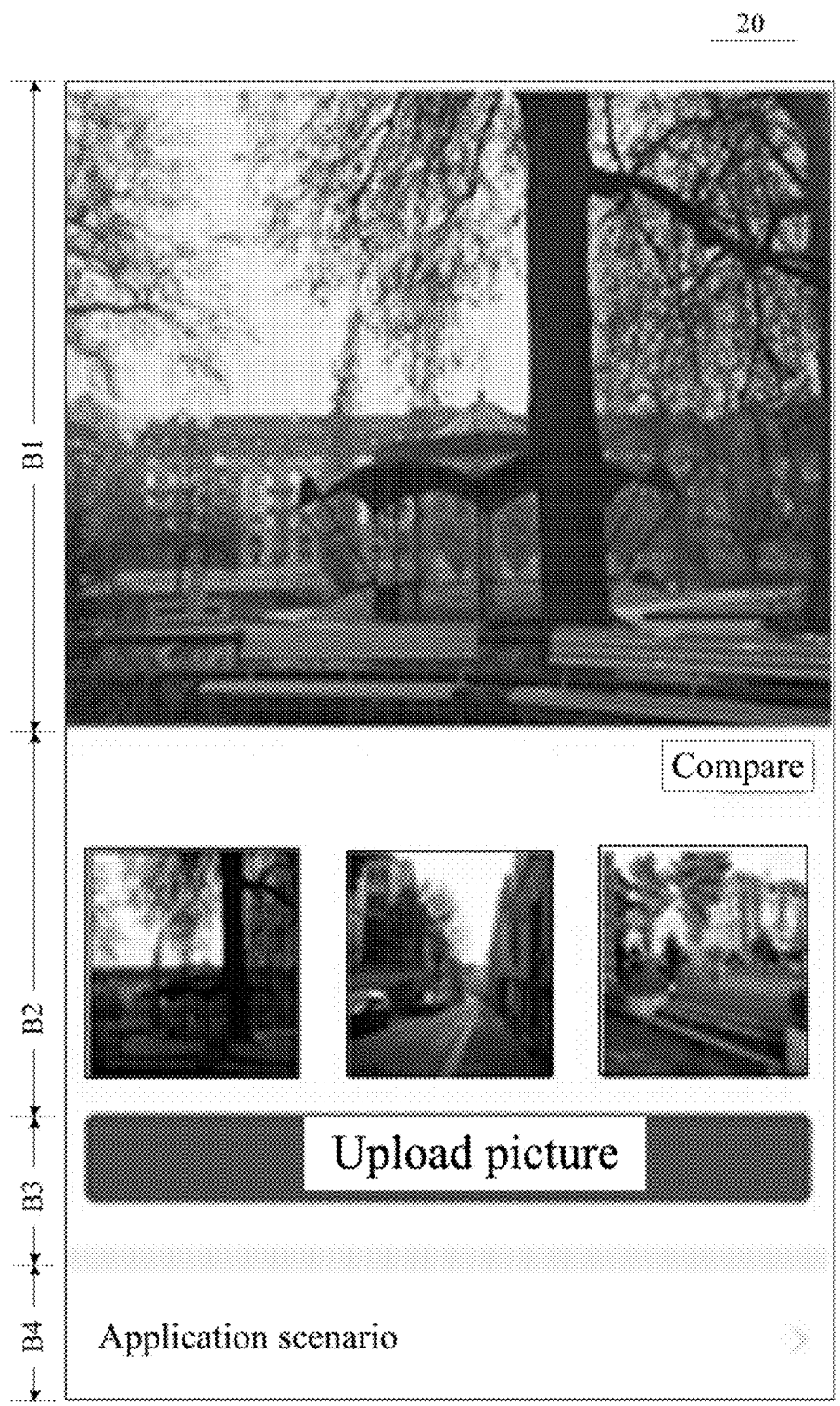
FIG. 8 is a sixth schematic diagram of an interface when the electronic equipment provided by an embodiment of the present disclosure performs display.

Specifically, the second interface shown in FIG. 7 will be described through specific embodiments. For example, when the selected tertiary function classification tag is HDR, the second interface 20 displayed on the display screen is shown in FIG. 8. 3 example pictures are displayed in the region B2, the selected example picture is the first example picture from left to right, the first example picture displayed in the region B2 is only a partial image, and the region B1 displays a complete picture of the first example picture, which is a complete picture after HDR processing. When the selected tertiary function classification tag is image style transfer, the second interface 20 displayed on the display screen is shown in FIG. 9, the second display region B2 displays example pictures of several styles, and the user can swipe left and right to view more styles.

Figure 9:
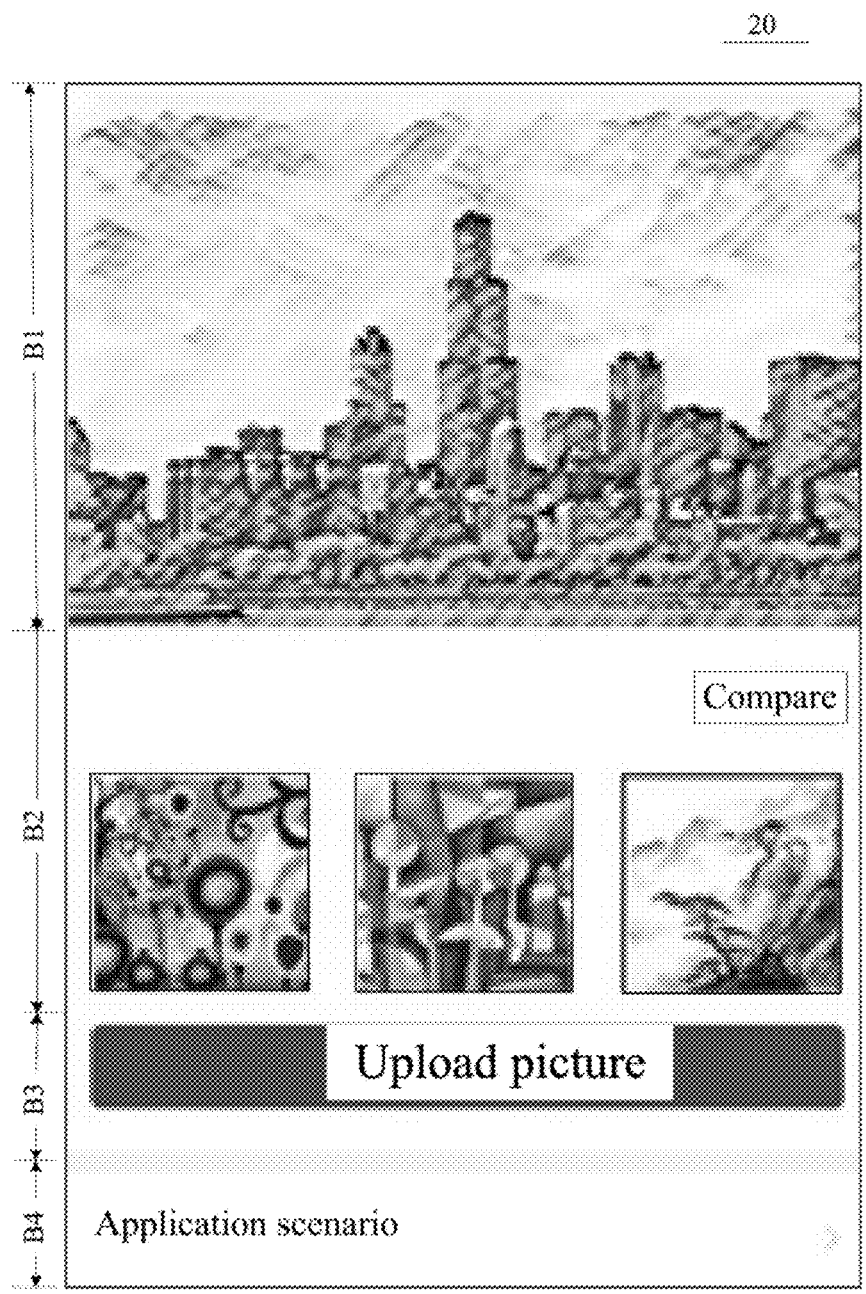
FIG. 9 is a seventh schematic diagram of an interface when the electronic equipment provided by an embodiment of the present disclosure performs display.

In specific implementation, in the implementation of the present disclosure, as shown in FIG. 8 and FIG. 9, when the display screen displays the second interface 20, the second display region B2 further includes an operation tag for comparison switching, for example, when a Compare button shown in FIG. 7 and FIG. 8 is selected, the picture of the first display region B1 may be switched between the experience object effect picture and the original picture so as to visually compare a processing effect.

Figure 10:
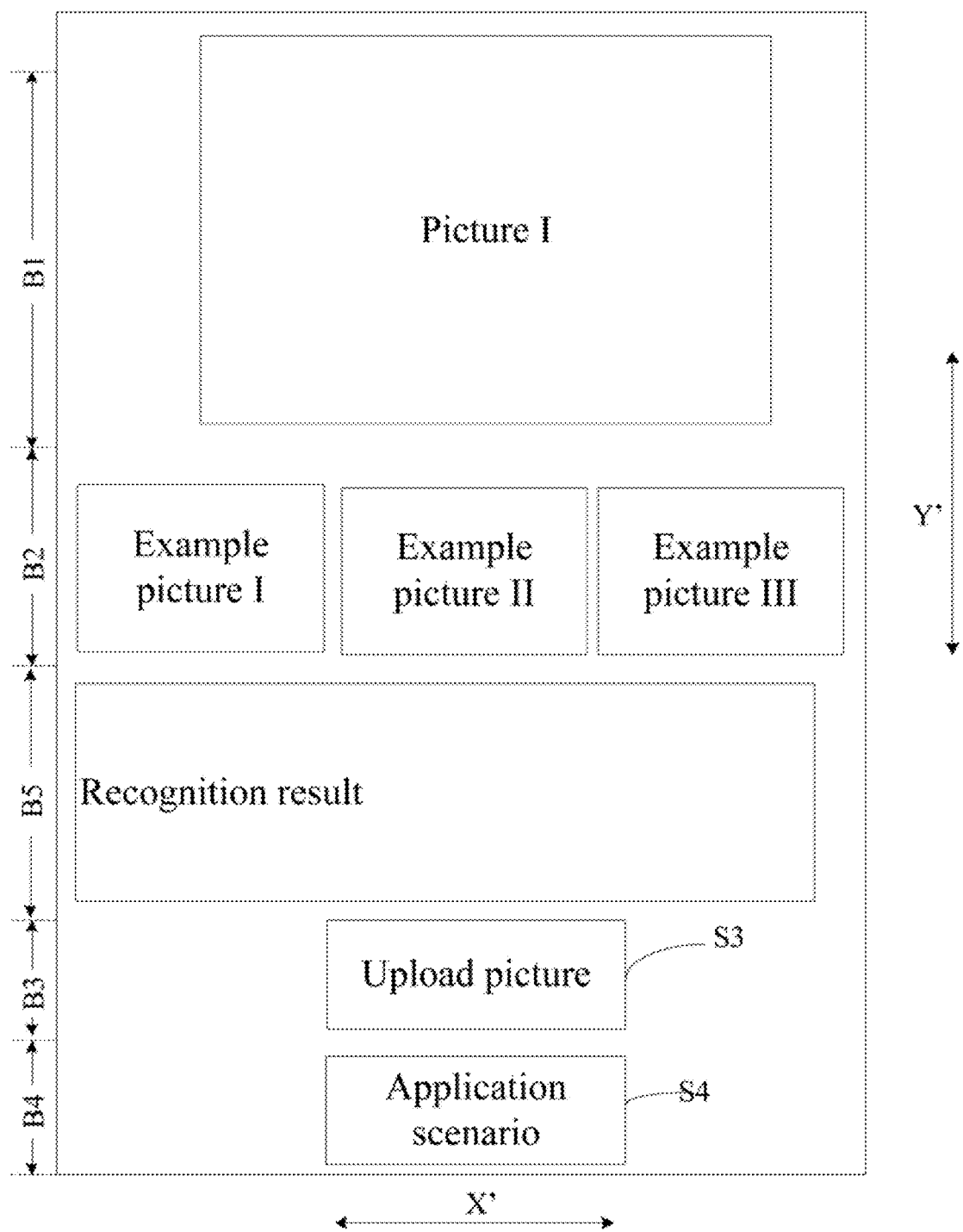
FIG. 10 is an eighth schematic diagram of an interface when the electronic equipment provided by an embodiment of the present disclosure performs display.

Optionally, in the electronic equipment provided by some embodiments of the present disclosure, when the display screen displays the second interface corresponding to the selected tertiary function classification tag, as shown in FIG. 10, the second interface further includes a fifth display region B5.

The fifth display region B5 displays attribute information of the complete picture.

Specifically, in some embodiments of the present disclosure, as shown in FIG. 10, the first display region B1, the second display region B2, the fifth display region B5, the third display region B3 and the fourth display region B4 are arranged along the fourth direction Y' on the second interface 20. Further, the fifth display region B5 may be disposed below the first display region B1 and the second display region B2, so as to facilitate comparison of the complete picture and the attribute information of the complete picture.

Figure 11:
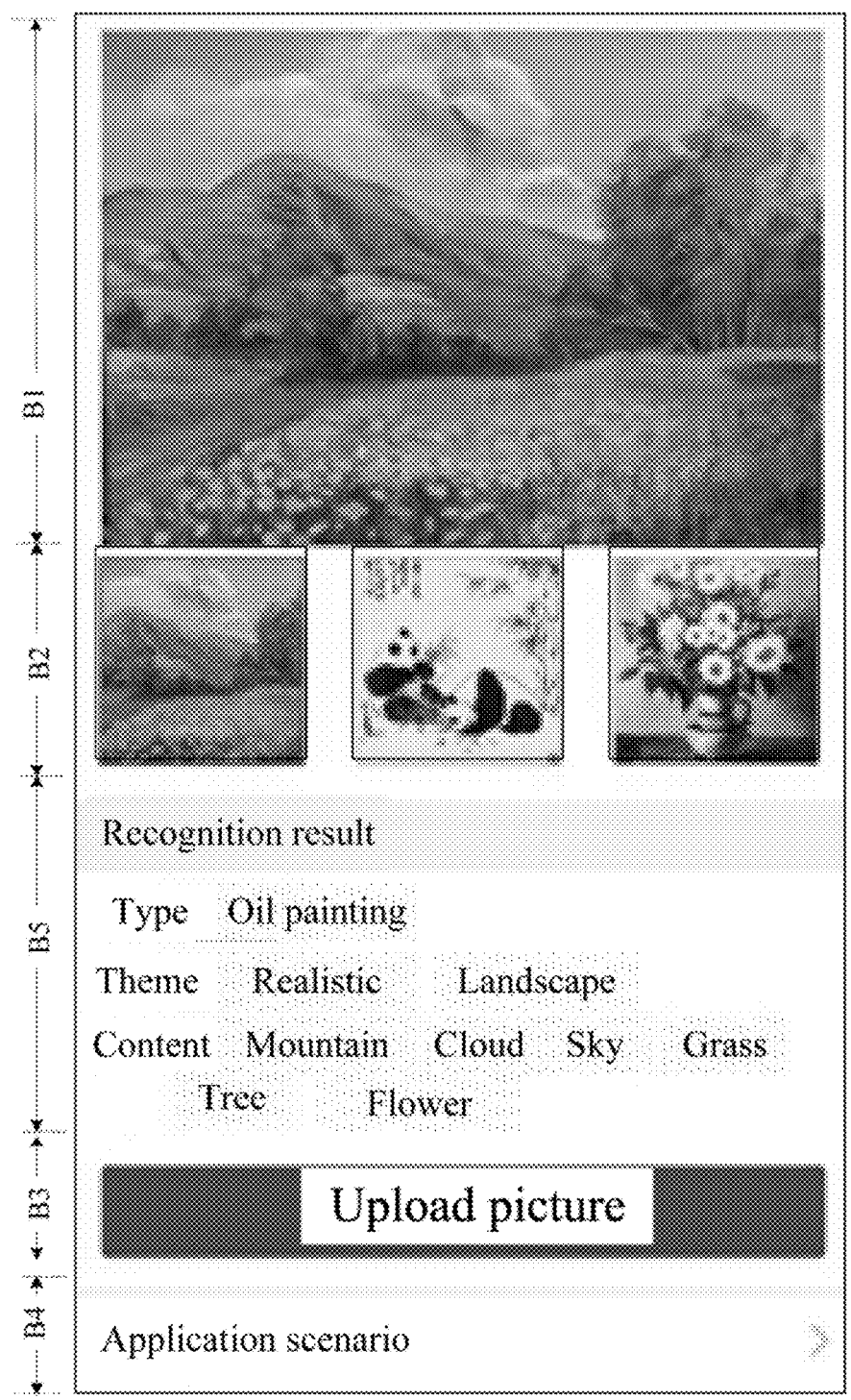
FIG. 11 is a ninth schematic diagram of an interface when the electronic equipment provided by an embodiment of the present disclosure performs display.

Specifically, the second interface shown in FIG. 10 will be described through specific embodiments. For example, when the selected tertiary function classification tag is painting recognition, the attribute information may include: type, theme, content and the like, which are not limited herein, for example, the second interface 20 is shown in FIG. 11. Further, confidence may be added after each recognition result, which is not limited herein.

Figure 12:
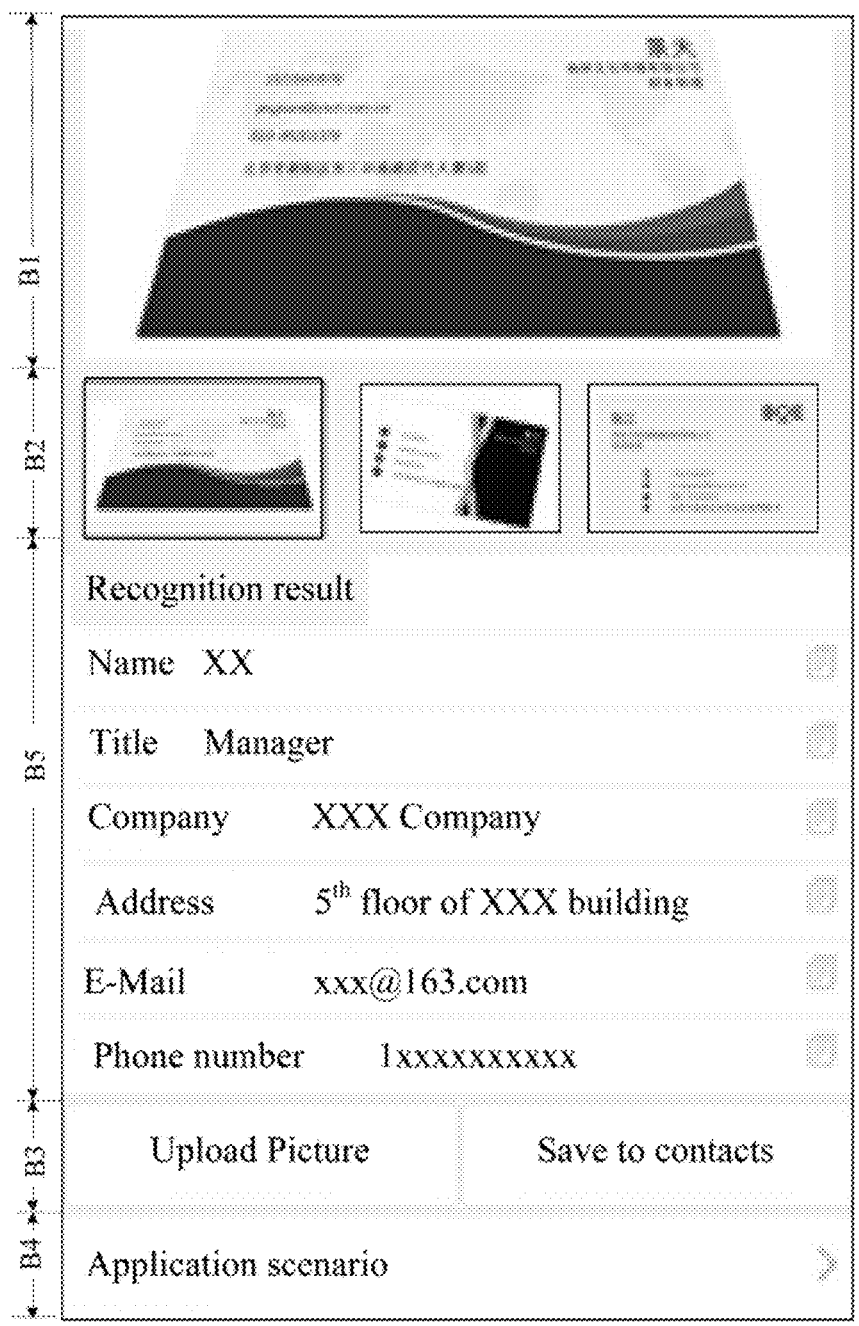
FIG. 12 is a tenth schematic diagram of an interface when the electronic equipment provided by an embodiment of the present disclosure performs display.

When the selected tertiary function classification tag is business card recognition, the attribute information may include various text information on a business card, and the second interface 20 displayed on the display screen is shown in FIG. 12.

Figure 13:
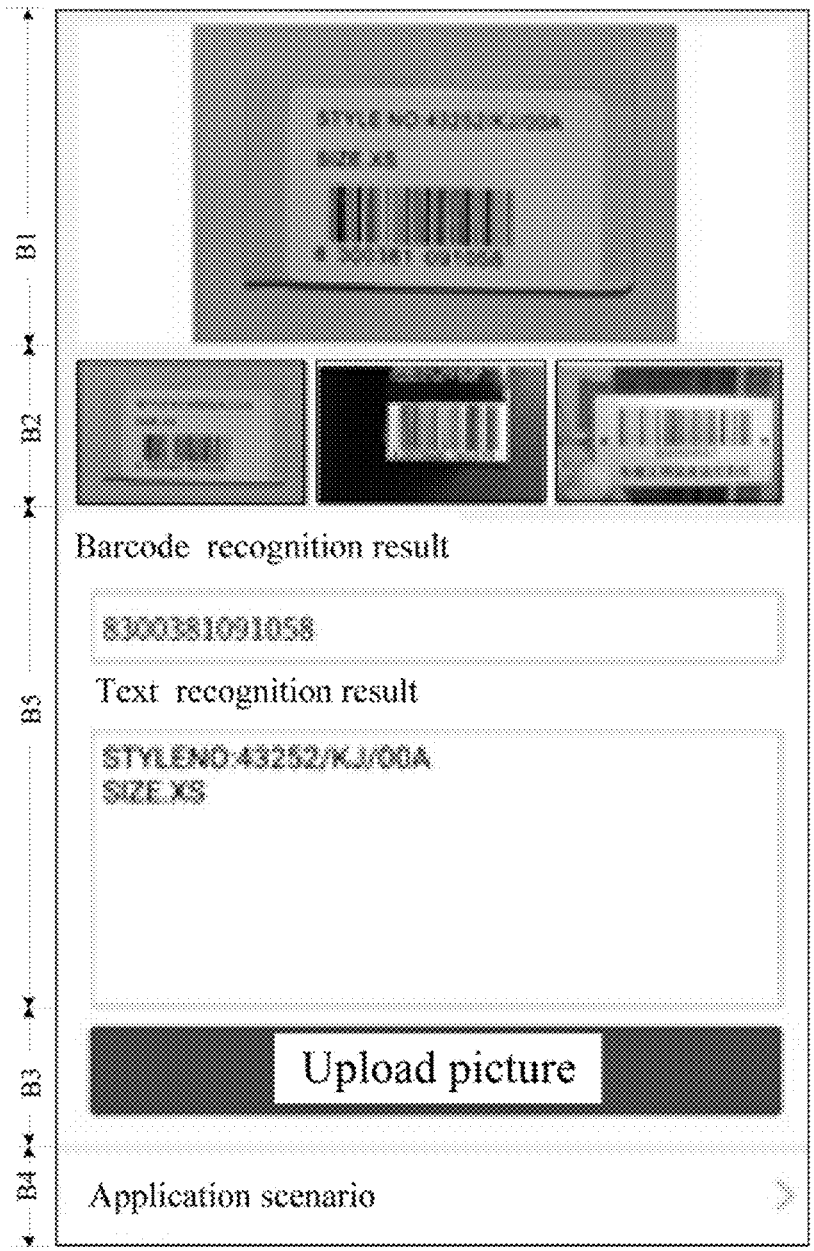
FIG. 13 is an eleventh schematic diagram of an interface when the electronic equipment provided by an embodiment of the present disclosure performs display.

When the selected tertiary function classification tag is barcode OCR, the attribute information may include a barcode recognition result and a text recognition result, and the second interface 20 displayed on the display screen is shown in FIG. 13.

Figure 14:
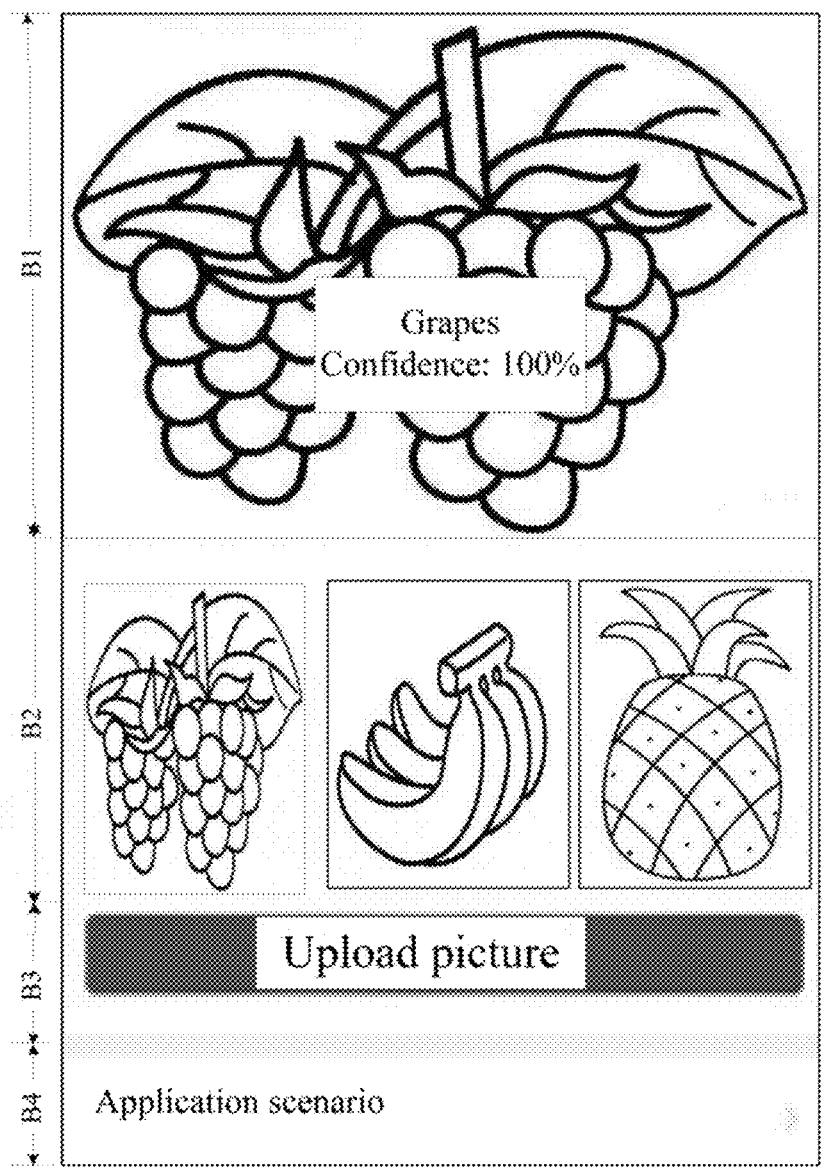
FIG. 14 is a twelfth schematic diagram of an interface when the electronic equipment provided by an embodiment of the present disclosure performs display.

Alternatively, optionally, in the electronic equipment provided by some embodiments of the present disclosure, as shown in FIG. 14, the first display region B1 further includes a recognition result of the experience object picture, and the recognition result is superimposed on the tertiary function experience object picture.

Specifically, for example, when the selected tertiary function classification tag is fruit recognition, the recognition result may include a fruit name and confidence, and the second interface 20 displayed on the display screen is shown, for example, in FIG. 14.

Optionally, in the electronic equipment provided by some embodiments of the present disclosure, the third display region further includes a second operation tag; and in response to selection of the second operation tag, the attribute information is saved into an attribute information data list. For example, as shown in FIG. 12, when the selected tertiary function classification tag is business card recognition, the third display region B3 further includes an operation tag for saving the attribute information to contacts, which is convenient for the user to save the attribute information into the contacts of a mobile phone. The attribute information includes an address, a mobile phone number and the like. The user may select the attribute information to be saved according to needs, for example, the user may select the mobile phone number and save the mobile phone number to the contacts.

Optionally, in the electronic equipment provided by some embodiments of the present disclosure, when the display screen displays the second interface corresponding to the selected tertiary function classification tag, the second interface includes a first display region, a second display region and a third display region.

In response to input information in the second display region, the first display region of the second interface of the display screen generates a first converted image corresponding to the input information.

Figure 15:
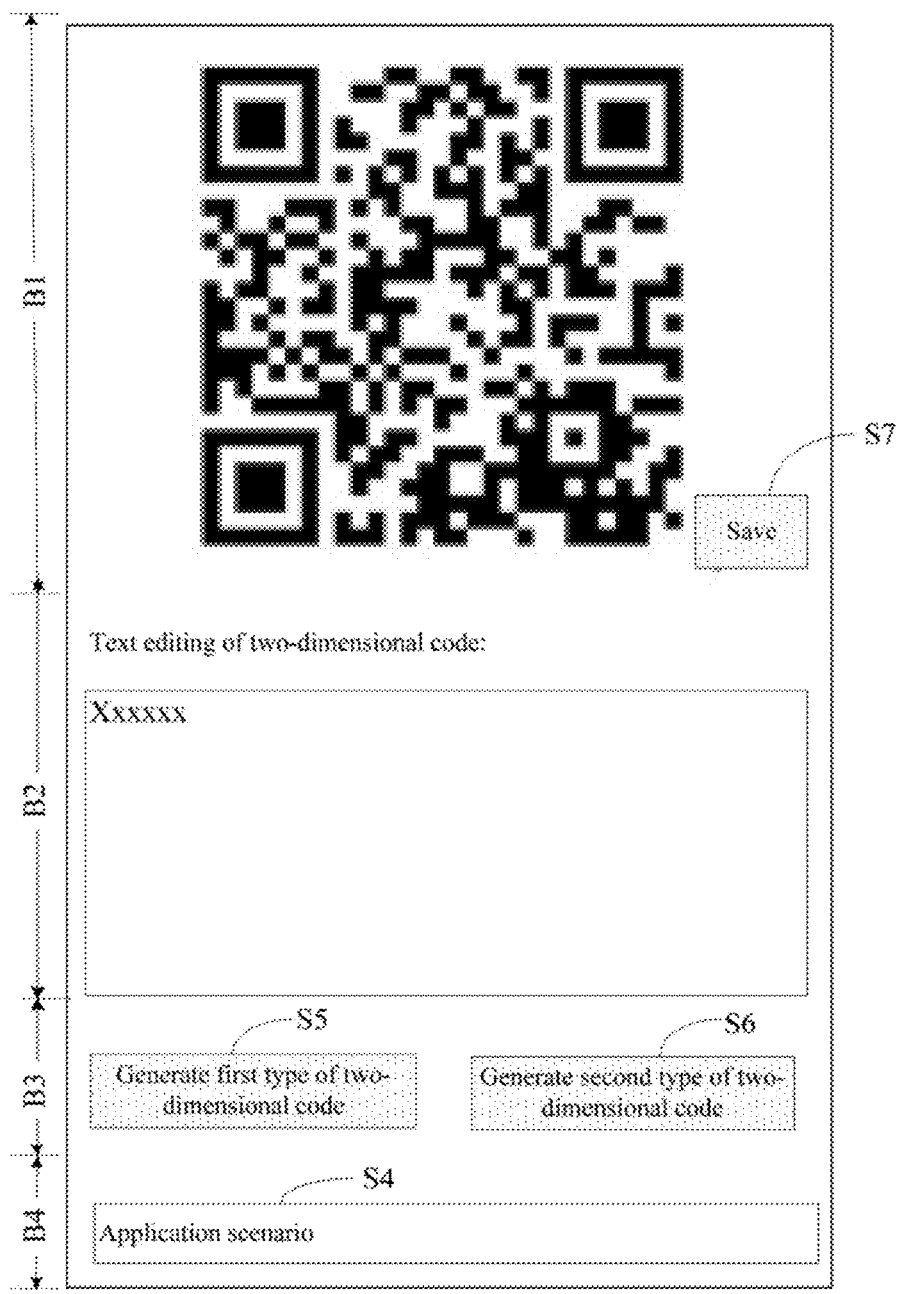
FIG. 15 is a thirteenth schematic diagram of an interface when the electronic equipment provided by an embodiment of the present disclosure performs display.

The third display region includes a third operation tag and a fourth operation tag, the third operation tag is configured to convert the first converted image into a second converted image, the fourth operation tag is configured to convert the first converted image into a third converted image, and the second converted image and the third converted image are different. Specifically, as shown in FIG. 15, the third operation tag is to generate a first type of two-dimensional code S5, and the fourth operation tag is to generate a second type of two-dimensional code S6. For example, the first type of two-dimensional code is a two-dimensional code (a two-dimensional code in a region C1 in FIG. 16) that can beautify a background, and the second type of two-dimensional code is a two-dimensional code (the two-dimensional code in the region C1 in FIG. 17) that can beautify a structure. The operation of generating the second converted image is to fuse a background image (an image of two horses in FIG. 16) and a two-dimensional code in FIG. 15, and the background image is not considered when processing the two-dimensional code of FIG. 15 in the fusion process. A two-dimensional code image (equivalent to the third converted image) in FIG. 17 considers the background image when processing the two-dimensional code in FIG. 15 in the fusion process of the background image and the two-dimensional code. Distribution of black and white dots in the obtained two-dimensional code of FIG. 17 is related to distribution of light and dark in the background image.

Specifically, the selected tertiary function classification tag being capable of achieving a function of encoding a text into a two-dimensional code is taken as an example. Specifically, when the display screen displays the second interface 20 corresponding to the selected tertiary function classification tag, as shown in FIG. 15, the second interface 20 includes a first display region B1, a second display region B2 and a third display region B3.

The first display region B1 includes a two-dimensional code generated according to the text.

The second display region B2 includes a text editing region for generating a two-dimensional code in the first display region B1.

The third display region B3 includes an operation tag S5 for generating a first type of two-dimensional code and an operation tag S6 for generating a second type of two-dimensional code, the first type of two-dimensional code and the second type of two-dimensional code are different.

Specifically, as shown in FIG. 15, the second interface 20 further includes a fourth display region B4, the fourth display region B4 includes an application scenario tag S4 associated with the selected tertiary function classification tag.

In specific implementation, the text editing region of the two-dimensional code in the second display region B2 is convenient for the user to input the text, and the background server may also configure a default text, which is convenient for the user to directly experience a function effect without input.

Optionally, in the electronic equipment provided by some embodiments of the present disclosure, as shown in FIG. 15, the first display region B1 further includes an operation tag S7 for saving a two-dimensional code, which is convenient for the user to save the generated two-dimensional code locally to the mobile phone.

In specific implementation, in some embodiments provided by the present disclosure, the first type of two-dimensional code and the second type of two-dimensional code being different means that the two-dimensional codes have different forms of expression, but information included in the two-dimensional codes may be the same. For example, the first type of two-dimensional code is a two-dimensional code that can beautify the background, and the second type of two-dimensional code is a two-dimensional code that can beautify the structure, which is not limited herein.

Optionally, in the electronic equipment provided by some embodiments of the present disclosure, in response to a trigger instruction of selecting one operation tag of the operation tag for generating the first type of two-dimensional code and the operation tag for generating the second type of two-dimensional code, a third interface is displayed on the display screen, the third interface includes a first function region, a second function region and a third function region distributed along the third direction.

The first function region includes a two-dimensional code with a background image.

The second function region includes a text editing region configured to modify the two-dimensional code.

The third function region includes an operation tag configured to change the background picture.

Figure 16:
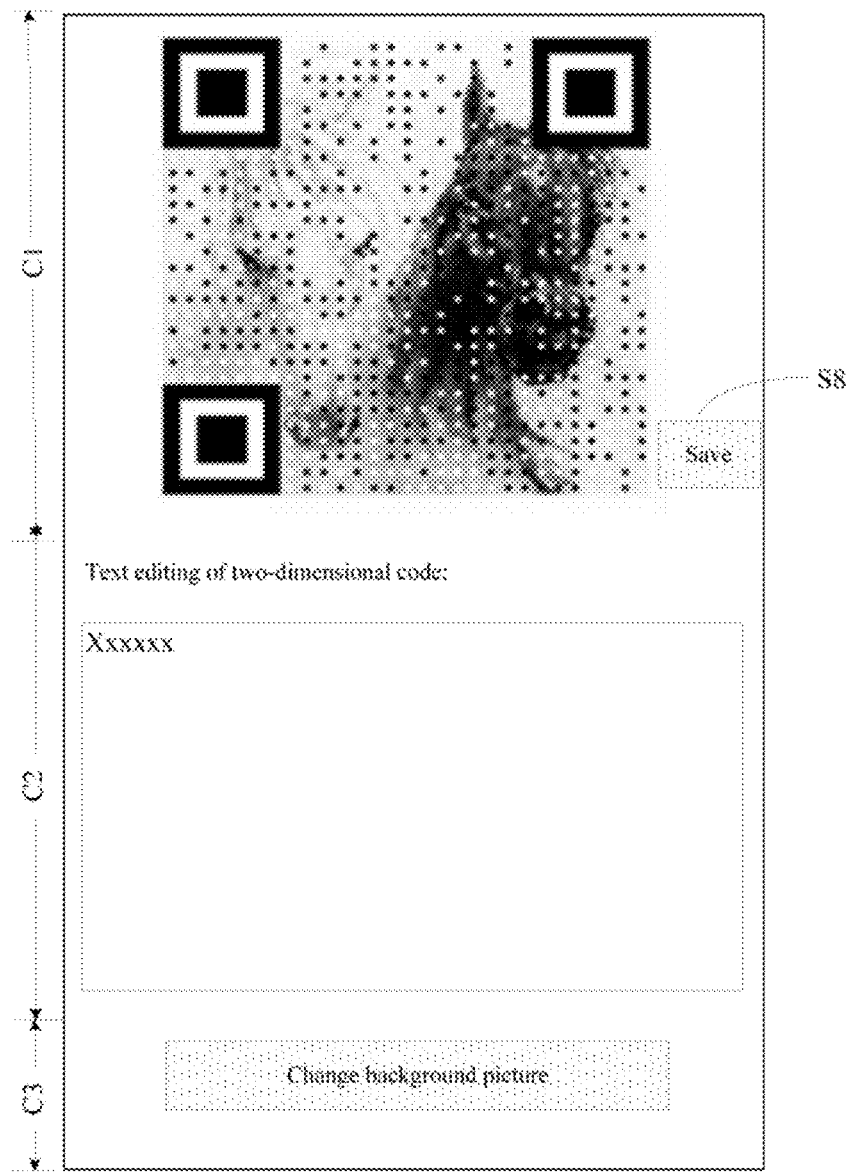
FIG. 16 is a fourteenth schematic diagram of an interface when the electronic equipment provided by an embodiment of the present disclosure performs display.
Figure 17:
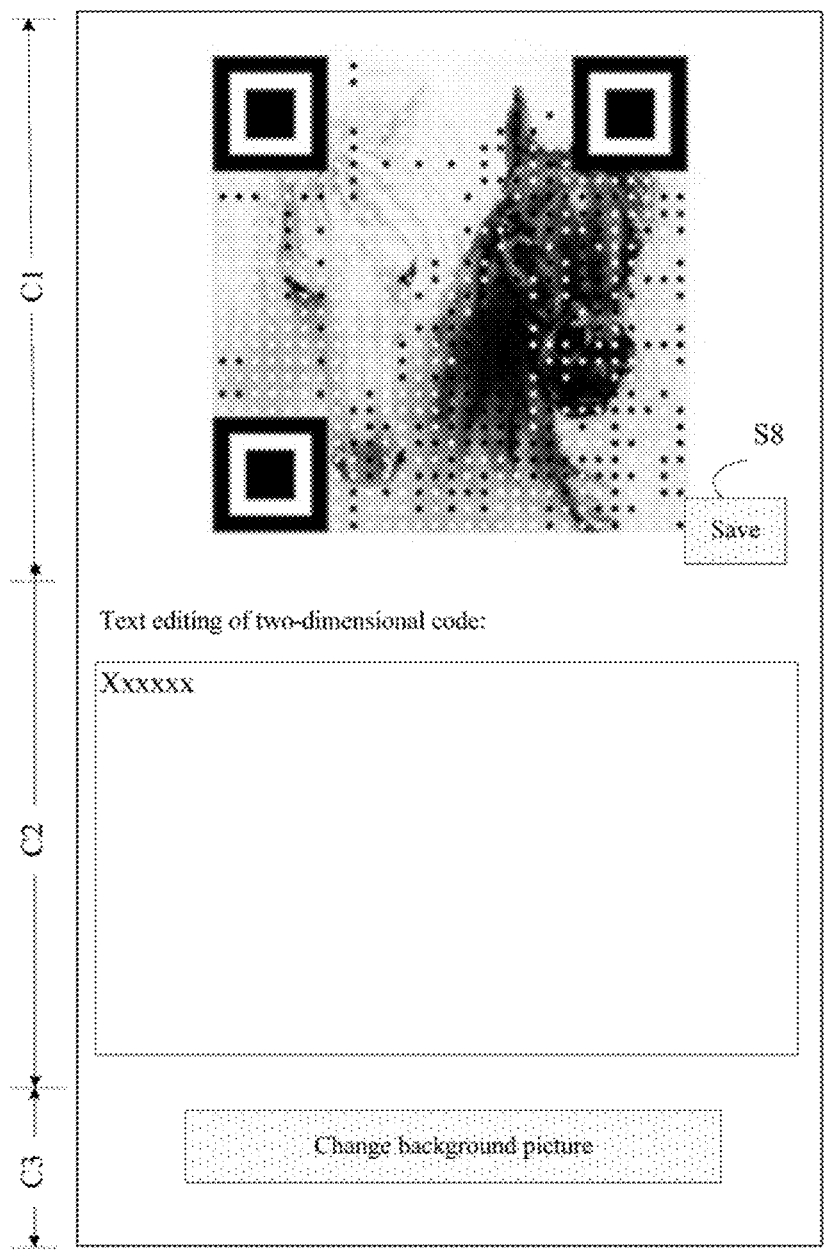
FIG. 17 is a fifteenth schematic diagram of an interface when the electronic equipment provided by an embodiment of the present disclosure performs display.

Specifically, when the first type of two-dimensional code is the two-dimensional code that can beautify the background, in the electronic equipment provided by some embodiments of the present disclosure, in response to the selection of the operation tag for generating the first type of two-dimensional code, as shown in FIG. 16, on the third interface 30:

the first function region C1 includes a two-dimensional code with a background image;

the second function region C2 includes a text editing region configured to modify the two-dimensional code; and the third function region C3 includes an operation tag configured to change the background picture.

Further, when the second type of two-dimensional code is the two-dimensional code that can beautify the structure, in the electronic equipment provided by some embodiments of the present disclosure, in response to the selection of the operation tag for generating the second type of two-dimensional code, as shown in FIG. 17, on the third interface 30, the two-dimensional code with the background image in the first function region C1 is obtained by adjusting the black and white elements in the two-dimensional code according to the light and dark regions of the background picture to improve an aesthetic effect of an artistic two-dimensional code.

Optionally, in the electronic equipment provided by some embodiments of the present disclosure, as shown in FIG. 16 and FIG. 17, the first function region C1 further includes an operation tag S8 configured to save a two-dimensional code.

Optionally, in the electronic equipment provided by some embodiments of the present disclosure, the processor is further configured to execute computer instructions to enable the electronic equipment to:

in response to a trigger instruction of selecting the application scenario tag, display on a link interface corresponding to the selected application scenario tag through the display screen:

introductions to the tertiary function classification tag associated with the application scenario tag, an operation tag convenient for the user to provide contact information, and an operation tag for the user to provide suggestion feedback.

Specifically, taking the tertiary function classification tag being painting recognition as an example, the link interface corresponding to the application scenario tag is shown in FIG. 18, in which the application scenario of the tertiary function classification tag is introduced, the application scenario includes a brief introduction and a detailed introduction. "Contact us" and "Suggestion Feedback" buttons are at a bottom of a page, and the buttons are tapped to open corresponding display interfaces.

Figure 19:
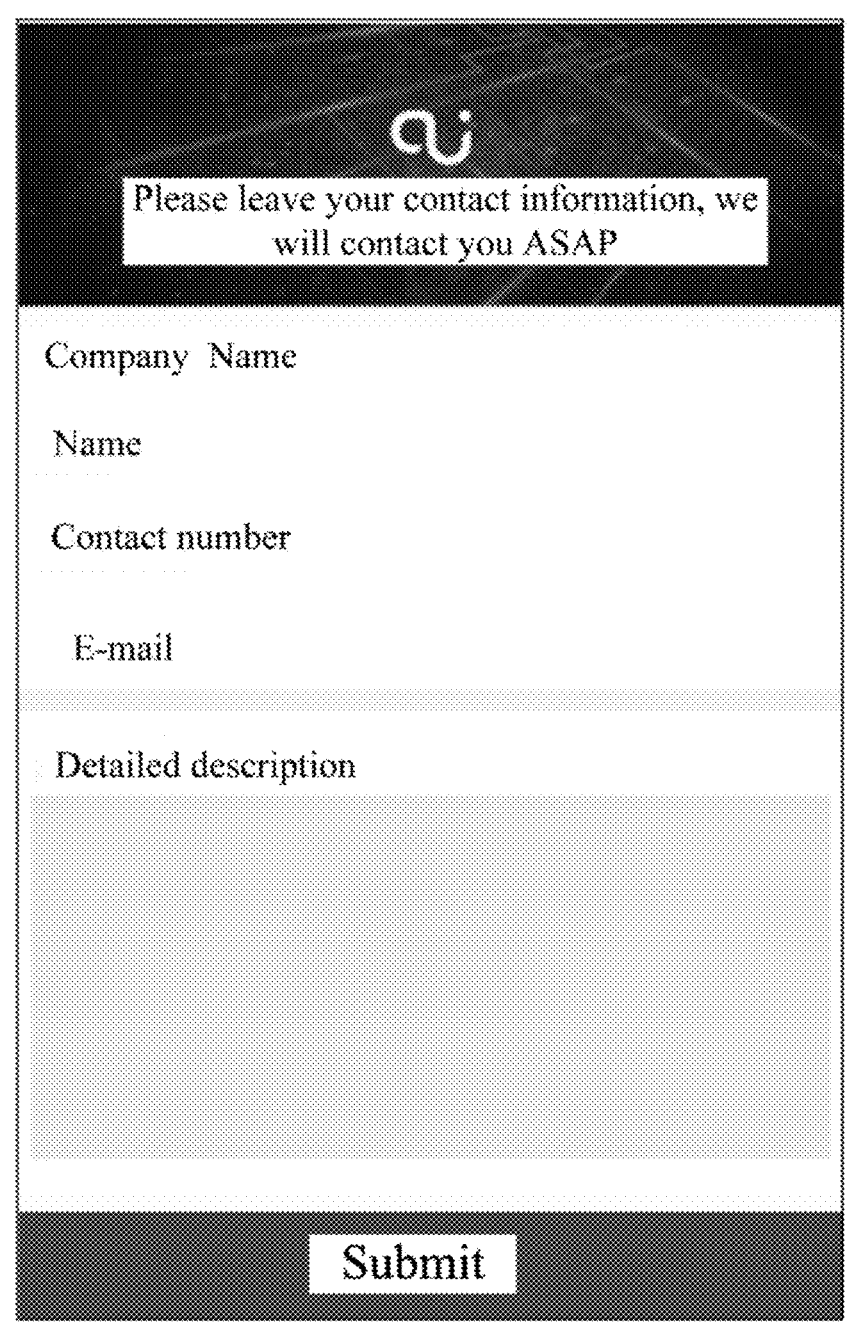

Specifically, for example, FIG. 19 shows the display interface opened by tapping the "Contact us" button. The interface provides the user with a window for business contact with an enterprise. The user sends his own information to a background by filling in a company name, name, contact number, E-mail, detailed description and other information and tapping a Submit button, and waits for the enterprise to contact him. After tapping the Submit button, the user will get a "Submitted successfully" prompt and jump to the first interface.

Figure 20:
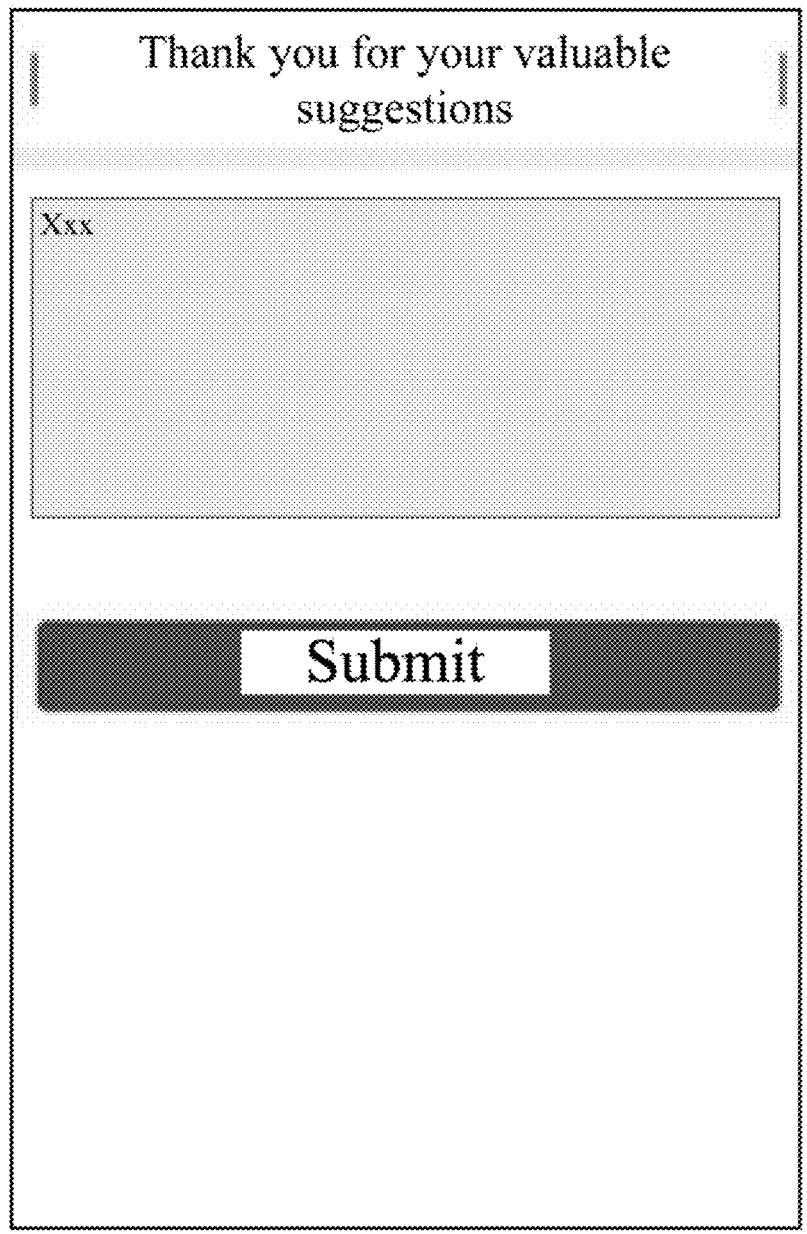
FIG. 20 is an eighteenth schematic diagram of an interface when the electronic equipment provided by an embodiment of the present disclosure performs display.

For example, FIG. 20 shows the display interface opened by tapping the "Suggestion Feedback" button. The interface provides the user with a window to provide feedback information on an algorithm. The user sends his own information to the background by filling in specific suggestions and tapping the Submit button. After tapping the Submit button, the user will get a "Submitted successfully, thank you for your valuable suggestions" prompt and jump to the first interface.

Specifically, the present disclosure is only schematically illustrated in the foregoing several embodiments, and is not specifically limited thereto.

The above electronic equipment provided by the embodiments of the present disclosure can enable the user to visually realize various intelligent experiences. Moreover, enterprise information is promoted to the user through carousel pictures on the first interface, artificial intelligence functions of the enterprise are displayed to the user according to the functions of the function classification tags at all levels, and the user can utilize default pictures or load local pictures to experience various algorithm functions and effects, download part of the processing results, understand the application scenarios of various functions, provide his own feedback suggestions on each function, and make business contacts with the enterprise and seek cooperation.

Based on the same inventive concept, some embodiments of the present disclosure further provides an interface display method applied to electronic equipment with a display screen. As shown in FIG. 21, the interface display method includes the following operations.

S101, a first interface is displayed on the display screen, the first interface includes a first region and a second region, the first region includes at least one primary function classification tag, and the second region includes a plurality of secondary function classification tags and at least one tertiary function classification tag included in each of the secondary function classification tags.

S102, in response to a trigger instruction of selecting one of the at least one primary function classification tag, a plurality of secondary function classification tags included in the selected primary function classification tag and at least one tertiary function classification tag included in each of the displayed secondary function classification tags in the second region are displayed on the display screen.

S103, in response to a trigger instruction of selecting one of the at least one tertiary function classification tag, a second interface is displayed on the display screen, content included in the second interface is different from content included in the first interface.

Based on the same inventive concept, some embodiments of the present disclosure further provides a user interface system for picture recognition, including a plurality of first function controls, at least one second function control, at least one third function control and a picture display control displayed in the user interface. Each of the plurality of first function controls presents a first picture corresponding to the each of the first function controls in the user interface, and presentation states of an object in the first pictures in the respective first function controls are different.

After the second function control is selected, it is operable to enable the user to select and upload a second picture.

After one of the plurality of first function controls is selected or after an operation of the user selecting and uploading the second picture, it is operable to enable a picture in the picture display control to be updated to the first picture corresponding to the selected one first function control or the second picture, and enable attribute information of the updated picture to be presented on the user interface.

After presenting the attribute information of the updated picture and selecting the third function control, it is operable to enable the attribute information of the updated picture to be stored into a first data list.

Figure 22:
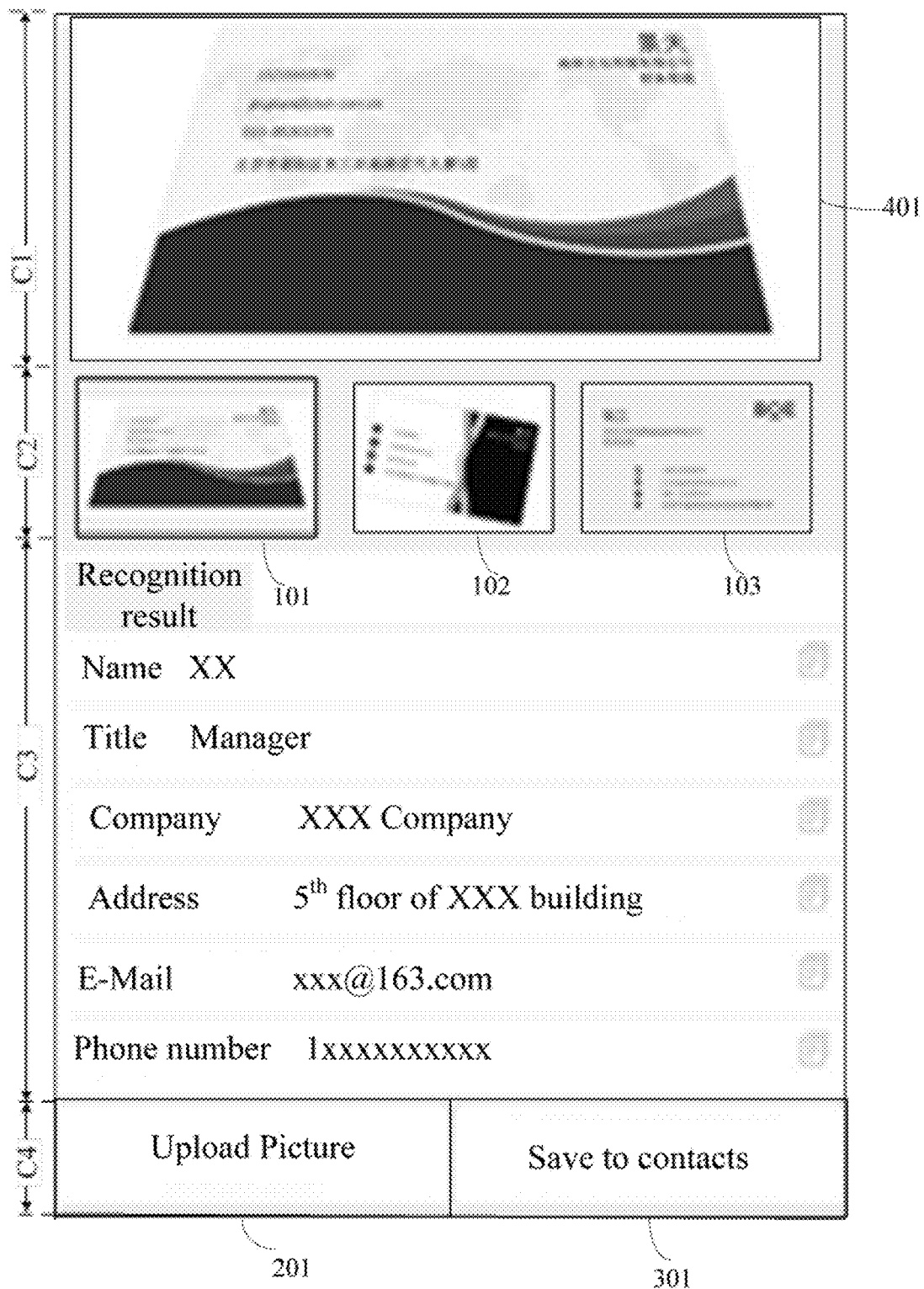
FIG. 22 is a schematic diagram of a user interface system for picture recognition provided by an embodiment of the present disclosure.

Specifically, the user interface system provided by some embodiments of the present disclosure is described by taking FIG. 22 as an example. The user interface can achieve the function of recognizing information in a business card uploaded by the user, and specifically includes three first function controls 101, 102 and 103, one second function control 201, one third function control 301 and a picture display control 401 displayed in the user interface. Each of the three first function controls 101-103 presents a first picture (a photo of a business card in FIG. 22) corresponding to each first function control in the user interface, and presentation states of an object (the business card in FIG. 22) in the first pictures in the respective first function controls in the user interface are different. Specifically, in FIG. 22, the business card in the picture corresponding to 101 is a business card photo taken overhead at an angle close to a lower edge of the business card, so the business card in the picture is trapezoidal (that is, the business card in the picture is in a distorted state); the business card in the picture corresponding to 102 is at an acute angle to the horizontal direction (that is, the business card in the picture is in an inclined state); and the business card in the picture corresponding to 103 is a photo taken overhead after the business card is put straight, so the long and short sides of the business card are parallel to long and short sides of the picture. Information on the business cards placed and photographed in the above three placement manners can be recognized by the system and recognition results can be displayed in a recognition result column.

After the second function control 201 (an upload picture control in FIG. 22) is selected by the user, it is operable to enable the user to select and upload a user-defined second picture. Specifically, the user may select the second function control by touching and tapping, or with a mouse, a gesture, a voice instruction or other manners. The user-defined picture uploaded by the user may be a picture stored in terminal equipment, or may be a picture taken by the user in real time or a picture downloaded from the Internet or a cloud server.

After one of the plurality of first function controls is selected or after an operation of the user selecting and uploading the second picture, it is operable to enable a picture in the picture display control to be updated to the first picture corresponding to the selected one first function control or the second picture, and enable attribute information of the updated picture to be presented on the user interface. For example, in FIG. 22, the selected first function control is 101. The picture display control 401 displays the picture corresponding to 101. While 101 is selected, the recognition result will also present relevant information in the business card corresponding to 101, specifically including a name, title, company, address, E-mail and mobile phone number. If the user uploads a user-defined picture, the picture display control 401 displays the user-defined picture uploaded by the user, and the recognition result is a recognition result of relevant information in the user-defined picture. The relevant information here may include text information, alphabetic information, digital information and the like in the user-defined picture.

After presenting the attribute information (for example, the relevant information of the business card corresponding to 101 in FIG. 22) of the updated picture and selecting the third function control 301, it is operable to enable the attribute information of the updated picture to be stored into a first data list. For example, 301 may be selected by tapping, and the relevant information in the business card may be saved into a relevant database. The control 301 in FIG. 22 can achieve a function of saving the mobile phone number into user's contacts, and the first data list here is a user's contact list. Of course, the user can also set a function of the control 301 according to needs.

Figure 23:
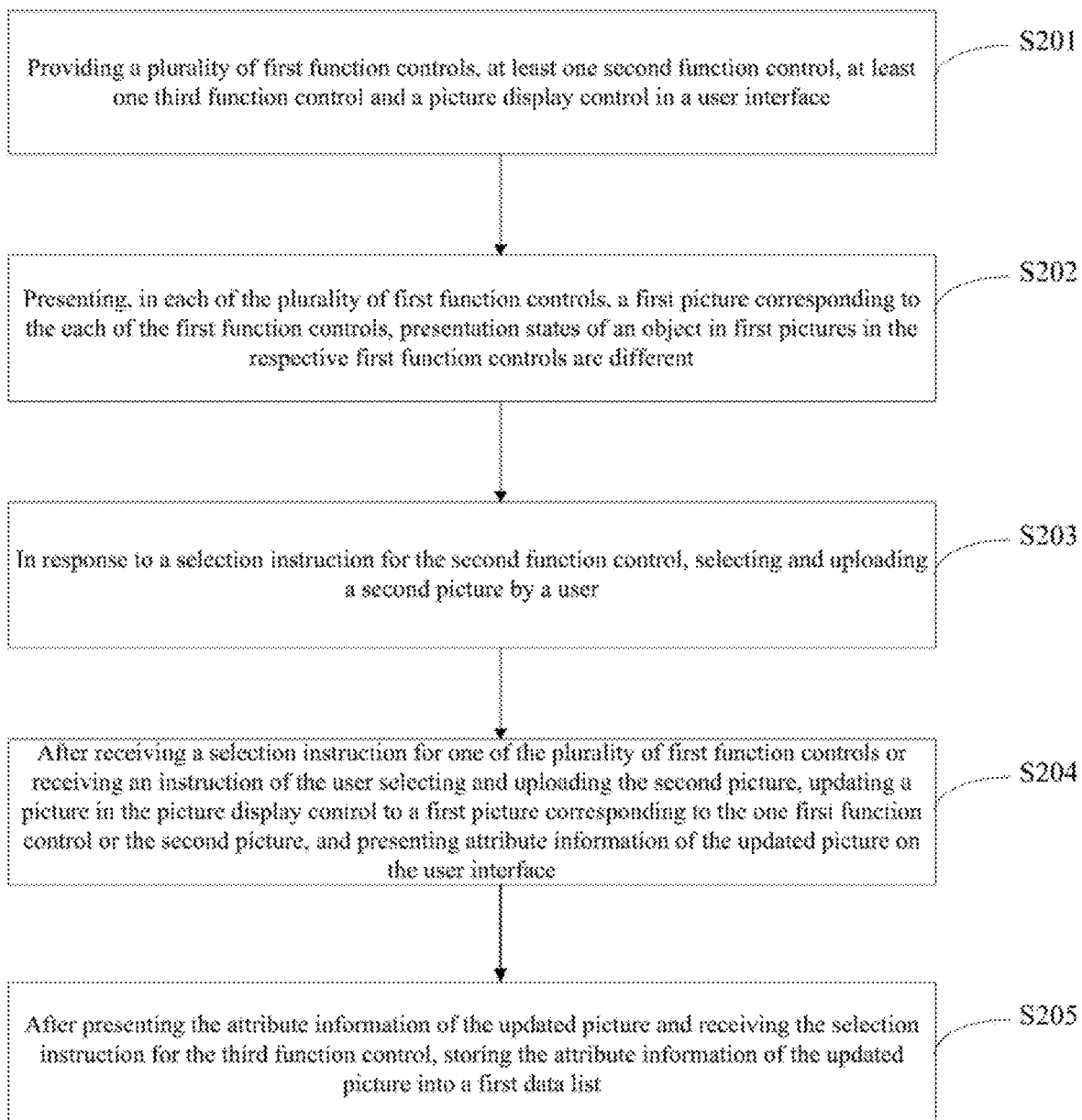
FIG. 23 is a flow diagram of an interaction method for picture recognition through a user interface provided by an embodiment of the present disclosure.

Based on the same inventive concept, some embodiments of the present disclosure further provides an interaction method for picture recognition through a user interface, as shown in FIG. 23, the method includes the following operations.

S201, a plurality of first function controls, at least one second function control, at least one third function control and a picture display control are provided in the user interface.

S202, each of the plurality of first function controls presents a first picture corresponding to the each of the first function controls, and presentation states of an object in the first pictures in the respective first function controls are different.

S203, in response to a selection instruction for the second function control, a user selects and uploads a second picture.

S204, after receiving a selection instruction for one of the plurality of first function controls or receiving an instruction of the user selecting and uploading the second picture, a picture in the picture display control is updated to the first picture corresponding to the selected one first function control or the second picture, and attribute information of the updated picture is presented on the user interface.

S205, after presenting the attribute information of the updated picture and receiving the selection instruction for the third function control, the attribute information of the updated picture is stored into a first data list.

Optionally, in the interaction method provided by some embodiments of the present disclosure, the attribute information of the updated picture includes at least one of text information, alphabetic information or digital information.

Specifically, taking FIG. 22 as an example, when the picture is a business card, the attribute information of the picture may include a name, title, company, address and E-mail.

Optionally, in the interaction method provided by some embodiments of the present disclosure, after presenting the attribute information of the updated picture and receiving the selection instruction for the third function control, storing the attribute information of the updated picture into the first data list includes:

when a plurality of pieces of the attribute information are presented, after receiving selected attribute information and receiving the selection instruction for the third function control, the selected attribute information is stored into the first data list.

Specifically, taking FIG. 22 as an example, each of the name, title, company, address and E-mail in the attribute information of the picture can be individually selected and stored in the first data list.

Optionally, in the interaction method provided by some embodiments of the present disclosure, the presentation state includes: at least one of an inclined state of the object or a distorted state of the object.

Specifically, taking FIG. 22 as an example, the presentation states of the object in respective first pictures are different, the business card in the picture corresponding to 101 is in a distorted state, and the business card in the picture corresponding to 102 is in an inclined state.

Specifically, the electronic equipment, computer storage media, computer program products or chips provided in embodiments of the present application are all configured to perform the corresponding methods provided above. Therefore, for beneficial effects that can be achieved, reference may be made to beneficial effects in the corresponding methods provided above, which will not be repeated here.

Through the description of the above embodiments, those skilled in the art can understand that, for the convenience and conciseness of description, only the division of the above-mentioned function modules is used as an example for illustration. In actual applications, the above-mentioned functions can be allocated to different function modules and completed according to needs, that is, the internal structure of a device is divided into different function modules to complete all or part of the functions described above.

In the several embodiments provided by the present application, it should be understood that the disclosed device and method may also be achieved in other manners. For example, the device embodiments described above are only schematic. For example, the division of modules or units is only a division of logical functions. In actual implementation, there may be other division manners, for example, a plurality of units or components may be combined or may be integrated into another device, or some characteristics may be omitted or not performed. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and the components displayed as units may be one physical unit or a plurality of physical units, that is, they may be located in one place, or may be distributed in a plurality of different places. Part or all of the units may be selected according to actual needs to achieve the purposes of the solution of the present embodiment.

In addition, the function units in each embodiment of the present application may be integrated into one processing unit, or each unit may exist alone physically, or two or more units may be integrated into one unit. The above integrated unit may be achieved in the form of hardware or achieved in the form of a software function unit.

If the integrated unit is achieved in the form of a software function unit and sold or used as an independent product, the integrated unit may be stored in a readable storage medium. Based on such an understanding, the technical solution of the embodiments of the present application essentially, or the part making a contribution to the prior art or all or part of the technical solution can be embodied in the form of a software product, and the software product is stored in a storage medium and includes several instructions configured to enable equipment (which may be a single-chip microcomputer, a chip or the like) or a processor to execute all or part of the steps of the methods of the embodiments of the present application. The foregoing storage medium includes: a USB flash disk, a mobile hard disk, a read only memory (ROM), a random access memory (RAM), a magnetic disk, a compact disk, or various other media that can store program codes.

The above contents are merely specific embodiments of the present application, but the protection scope of the present application is not limited thereto. Any person skilled in the art can easily think of changes or replacements within the technical scope disclosed in the present application, which should be included in the protection scope of the present application. Therefore, the protection scope of the present application shall be subject to the protection scope of the claims.

What is claimed is:

1. Electronic equipment, comprising a display screen, a memory and a processor, wherein
    the memory is connected to the display screen and the processor and configured to store computer instructions and save data associated with the display screen; and
    the processor is connected to the display screen and the memory and configured to execute the computer instructions to enable the electronic equipment to:
        display a first interface on the display screen, wherein the first interface comprises a first region and a second region, the first region comprises at least one primary function classification tag, and the second region comprises a plurality of secondary function classification tags and at least one tertiary function classification tag comprised in each of the secondary function classification tags;
        in response to a trigger instruction of selecting one of the at least one primary function classification tag, display a plurality of secondary function classification tags comprised in the selected one of the at least one primary function classification tag and at least one tertiary function classification tag comprised in each of the displayed secondary function classification tags in the second region on the display screen; and
        in response to a trigger instruction of selecting one of the displayed at least one tertiary function classification tag, display a second interface on the display screen, wherein content comprised in the second interface is different from content comprised in the first interface;
    wherein when the display screen displays the first interface, in response to a trigger instruction of directionally moving along a first direction in the second region, a corresponding primary function classification tag is selected.

2. The electronic equipment according to claim 1, wherein the first interface further comprises a third region, and the third region, the first region and the second region are sequentially arranged along a top-to-bottom direction of the first interface.

3. The electronic equipment according to claim 1, wherein when the display screen displays the second interface corresponding to the selected tertiary function classification tag, the second interface comprises a first display region, a second display region, a third display region and a fourth display region;
    the first display region comprises a tertiary function experience object picture or a tertiary function experience object effect picture; the second display region comprises a plurality of example pictures distributed along a third direction, and a size of each of the plurality of example pictures is less than a size of the picture in the first display region;
    in response to a selection instruction for one of the plurality of example pictures, the first display region displays an effect picture and a complete picture corresponding to the selected example picture, wherein the effect picture corresponds to a function corresponding to the selected tertiary function classification tag;

in response to a trigger instruction of directionally moving along the third direction, the plurality of example pictures move along the third direction in the second display region;

the third display region comprises a first operation tag for uploading pictures; and the fourth display region comprises an application scenario tag associated with the selected tertiary function classification tag.

4. The electronic equipment according to claim 3, wherein the first display region, the second display region, the third display region and the fourth display region are arranged along a fourth direction on the second interface, the third direction being a horizontal direction on the display screen, and the fourth direction being a vertical direction on the display screen.

5. The electronic equipment according to claim 3, wherein when the display screen displays the second interface corresponding to the selected tertiary function classification tag, the second interface further comprises a fifth display region; and the fifth display region displays attribute information of the complete picture.

6. The electronic equipment according to claim 5, wherein the third display region further comprises a second operation tag; and in response to selection of the second operation tag, the attribute information is saved into an attribute information data list.

7. The electronic equipment according to claim 1, wherein when the display screen displays the second interface corresponding to the selected tertiary function classification tag, the second interface comprises a first display region, a second display region and a third display region;

in response to input information in the second display region, the first display region of the second interface of the display screen generates a first converted image corresponding to the input information; and the third display region comprises a third operation tag and a fourth operation tag, the third operation tag being configured to convert the first converted image into a second converted image, the fourth operation tag being configured to convert the first converted image into a third converted image, and the second converted image and the third converted image being different.

8. The electronic equipment according to claim 2, wherein when the display screen displays the first interface, in response to a trigger instruction of directionally moving along a second direction, the entire first interface moves along the second direction relative to the display screen, and when the first region of the first interface moves to a top of the first interface, the first region remains at a fixed position, and the second region moves along the second direction.

9. An interaction method for electronic equipment, wherein the electronic equipment comprises a display screen, and the method comprises:

controlling the display screen to display a first interface, wherein the first interface comprises a first region and a second region, the first region comprises at least one primary function classification tag, and the second region comprises a plurality of secondary function classification tags and at least one tertiary function classification tag comprised in each of the secondary function classification tags;

in response to a trigger instruction of selecting one of the at least one primary function classification tag, controlling the display screen to display a plurality of secondary function classification tags comprised in the selected one of the at least one primary function classification tag and at least one tertiary function classification tag comprised in each of the displayed secondary function classification tags in the second region; and in response to a trigger instruction of selecting one of the at least one tertiary function classification tag, controlling the display screen to display a second interface, wherein content comprised in the second interface is different from content comprised in the first interface; and when the display screen displays the first interface, in response to a trigger instruction of directionally moving along a first direction in the second region, selecting a corresponding primary function classification tag.

10. The interaction method according to claim 9, wherein when the display screen displays the second interface corresponding to the selected tertiary function classification tag, the second interface comprises a first display region, a second display region, a third display region and a fourth display region;

the first display region comprises a tertiary function experience object picture or a tertiary function experience object effect picture; the second display region comprises a plurality of example pictures distributed along a third direction, and a size of each of the plurality of example pictures is less than a size of the picture in the first display region; the third display region comprises a first operation tag for uploading pictures; and the fourth display region comprises an application scenario tag associated with the selected tertiary function classification tag; and the method further comprises:

in response to a selection instruction for one of the plurality of example pictures, displaying in the first display region an effect picture and a complete picture corresponding to the selected example picture, wherein the effect picture corresponds to a function corresponding to the selected tertiary function classification tag; and in response to a trigger instruction of directionally moving along the third direction, controlling the plurality of example pictures to move along the third direction in the second display region.

11. The interaction method according to claim 10, wherein when the display screen displays the second interface corresponding to the selected tertiary function classification tag, the second interface further comprises a fifth display region; and the method further comprises:

controlling the fifth display region to display attribute information of the complete picture.

12. The interaction method according to claim 11, wherein the third display region further comprises a second operation tag; and the method further comprises:

in response to selection of the second operation tag, saving the attribute information into an attribute information data list.

13. The interaction method according to claim 9, wherein when the display screen displays the second interface corresponding to the selected tertiary function classification tag, the second interface comprises a first display region, a second display region and a third display region; the third display region comprises a third operation tag and a fourth operation tag; and the method further comprises:

in response to input information in the second display region, controlling the first display region of the second interface of the display screen to generate a first converted image corresponding to the input information;
in response to a trigger instruction of selecting the third operation tag, converting the first converted image into a second converted image; and
in response to a trigger instruction of selecting the fourth operation tag, converting the first converted image into a third converted image;
wherein the second converted image and the third converted image are different.

14. The interaction method according to claim 9, further comprising:
when the display screen displays the first interface, in response to a trigger instruction of directionally moving along a second direction, controlling the entire first interface to move along the second direction relative to the display screen, and when the first region of the first interface moves to a top of the first interface, controlling the first region to remain at a fixed position, and controlling the second region to move along the second direction.

15. Electronic equipment, comprising a display screen, a memory and a processor, wherein
the memory is connected to the display screen and the processor and configured to store computer instructions and save data associated with the display screen; and
the processor is connected to the display screen and the memory and configured to execute the computer instructions to enable the electronic equipment to:
display a first interface on the display screen, wherein the first interface comprises a first region and a second region, the first region comprises at least one primary function classification tag, and the second region comprises a plurality of secondary function classification tags and at least one tertiary function classification tag comprised in each of the secondary function classification tags;
in response to a trigger instruction of selecting one of the at least one primary function classification tag, display a plurality of secondary function classification tags comprised in the selected one of the at least one primary function classification tag and at least one tertiary function classification tag comprised in each of the displayed secondary function classification tags in the second region on the display screen; and
in response to a trigger instruction of selecting one of the displayed at least one tertiary function classification tag, display a second interface on the display screen, wherein content comprised in the second interface is different from content comprised in the first interface;
wherein when the display screen displays the second interface corresponding to the selected tertiary function classification tag, the second interface comprises a first display region, a second display region, a third display region and a fourth display region;

the first display region comprises a tertiary function experience object picture or a tertiary function experience object effect picture; the second display region comprises a plurality of example pictures distributed along a third direction, and a size of each of the plurality of example pictures is less than a size of the picture in the first display region;
in response to a selection instruction for one of the plurality of example pictures, the first display region displays an effect picture and a complete picture corresponding to the selected example picture, wherein the effect picture corresponds to a function corresponding to the selected tertiary function classification tag;
in response to a trigger instruction of directionally moving along the third direction, the plurality of example pictures move along the third direction in the second display region;
the third display region comprises a first operation tag for uploading pictures; and
the fourth display region comprises an application scenario tag associated with the selected tertiary function classification tag.

16. The electronic equipment according to claim 15, wherein the first interface further comprises a third region, and the third region, the first region and the second region are sequentially arranged along a top-to-bottom direction of the first interface; and
when the display screen displays the first interface, in response to a trigger instruction of directionally moving along a second direction, the entire first interface moves along the second direction relative to the display screen, and when the first region of the first interface moves to a top of the first interface, the first region remains at a fixed position, and the second region moves along the second direction.

17. The electronic equipment according to claim 15, wherein the first display region, the second display region, the third display region and the fourth display region are arranged along a fourth direction on the second interface, the third direction being a horizontal direction on the display screen, and the fourth direction being a vertical direction on the display screen.

18. The electronic equipment according to claim 15, wherein when the display screen displays the second interface corresponding to the selected tertiary function classification tag, the second interface further comprises a fifth display region; and
the fifth display region displays attribute information of the complete picture.

19. The electronic equipment according to claim 18, wherein the third display region further comprises a second operation tag; and in response to selection of the second operation tag, the attribute information is saved into an attribute information data list.

* * * * *